United States Patent
Tanaka et al.

(10) Patent No.: US 10,176,594 B2
(45) Date of Patent: Jan. 8, 2019

(54) PROGRESSIVE IN-VEHICLE CAMERA CALIBRATOR, IMAGE GENERATOR, IN-VEHICLE CAMERA CALIBRATION METHOD, AND IMAGE GENERATION METHOD

(71) Applicant: DENSO CORPORATION, Kariya, Aichi-pref. (JP)

(72) Inventors: Hitoshi Tanaka, Kariya (JP); Youji Morishita, Kariya (JP); Muneaki Matsumoto, Kariya (JP)

(73) Assignee: DENSO CORPORATION, Kariya, Aichi-Pref. (JP)

( * ) Notice: Subject to any disclaimer, the term of this patent is extended or adjusted under 35 U.S.C. 154(b) by 80 days.

(21) Appl. No.: 15/517,141

(22) PCT Filed: Sep. 24, 2015

(86) PCT No.: PCT/JP2015/004855
§ 371 (c)(1),
(2) Date: Apr. 5, 2017

(87) PCT Pub. No.: WO2016/056197
PCT Pub. Date: Apr. 14, 2016

(65) Prior Publication Data
US 2017/0309042 A1   Oct. 26, 2017

(30) Foreign Application Priority Data
Oct. 9, 2014   (JP) .................................. 2014-208448

(51) Int. Cl.
*G06T 7/80*        (2017.01)
*B60R 1/00*        (2006.01)
(Continued)

(52) U.S. Cl.
CPC .................. *G06T 7/80* (2017.01); *B60R 1/00* (2013.01); *H04N 5/232* (2013.01);
(Continued)

(58) Field of Classification Search
CPC ....... B60R 2300/402; B60R 1/00; G06T 7/80; G06T 2207/30252; H04N 5/232; H04N 17/002
See application file for complete search history.

(56) References Cited

U.S. PATENT DOCUMENTS

| 8,760,521 B2 * | 6/2014 | Medeiros ................ G06T 7/292 348/187 |
| 2008/0181488 A1 * | 7/2008 | Ishii .......................... B60R 1/00 382/154 |

(Continued)

FOREIGN PATENT DOCUMENTS

| JP | 2007256030 A | * 10/2007 |
| JP | 2013129264 A | * 7/2013 |

(Continued)

*Primary Examiner* — Jamie J Atala
*Assistant Examiner* — Michael Robert Cammarata
(74) *Attorney, Agent, or Firm* — Knobbe, Martens, Olson & Bear, LLP

(57) ABSTRACT

An in-vehicle camera calibrator is provided. The in-vehicle camera calibrator includes a targeted camera selector for selecting a targeted camera requiring the calibration, an intermediate camera selector for selecting an intermediate camera which is the in-vehicle camera that intervenes between the targeted camera and a criterial camera, a first calibrator for, when the intermediate camera is not selected, calibrating the targeted camera based on a captured image of an overlapping region between the criterial camera and the targeted camera, and a second calibrator for, when the intermediate camera is selected, calibrating the intermediate camera based on a captured image of an overlapping region between the criterial camera and the targeted camera, and then calibrating the targeted camera based on a captured image between the calibrated intermediate camera and the targeted camera.

6 Claims, 20 Drawing Sheets

(51) Int. Cl.
*H04N 5/232* (2006.01)
*H04N 17/00* (2006.01)

(52) U.S. Cl.
CPC ...... *H04N 17/002* (2013.01); *B60R 2300/402* (2013.01); *G06T 2207/30252* (2013.01)

(56) References Cited

U.S. PATENT DOCUMENTS

| | | | |
|---|---|---|---|
| 2008/0285843 A1* | 11/2008 | Lim | G06K 9/2036 382/154 |
| 2011/0115922 A1 | 5/2011 | Shimizu | |
| 2014/0139674 A1 | 5/2014 | Aoki et al. | |
| 2014/0320658 A1* | 10/2014 | Pliefke | B60R 1/002 348/148 |
| 2014/0347486 A1* | 11/2014 | Okouneva | G06T 7/0004 348/148 |
| 2015/0145965 A1* | 5/2015 | Livyatan | B60R 1/00 348/47 |
| 2016/0236619 A1* | 8/2016 | Tanaka | G06T 7/80 |
| 2017/0103546 A1* | 4/2017 | Wang | B60R 11/04 |
| 2018/0164748 A1* | 6/2018 | Salle | G04F 10/005 |

FOREIGN PATENT DOCUMENTS

| | | | |
|---|---|---|---|
| JP | 2014-082622 A | | 5/2014 |
| JP | 2014082622 A | * | 5/2014 |

* cited by examiner

DISPLAY RANGE OF BIRD'S-EYE IMAGE

DISPLAY RANGE OF BIRD'S-EYE IMAGE

PROGRESSIVE IN-VEHICLE CAMERA CALIBRATOR, IMAGE GENERATOR, IN-VEHICLE CAMERA CALIBRATION METHOD, AND IMAGE GENERATION METHOD

CROSS REFERENCE TO RELATED APPLICATION

This application is based on Japanese Patent Application No. 2014-208448 filed on Oct. 9, 2014, disclosure of which is incorporated herein by reference.

TECHNICAL FIELD

The present disclosure relates to a technology that is applied to a vehicle mounted with a plurality of in-vehicle cameras and generates an image to monitor a situation around the vehicle by using an image captured by an in-vehicle camera. Alternatively, the present disclosure relates to a technology that calibrates an in-vehicle camera.

BACKGROUND ART

An important thing to safely drive a vehicle is to comprehend positions of various objects (such as an obstacle and a pedestrian) existing around a vehicle. A recent-day vehicle captures a surrounding image by using a plurality of in-vehicle cameras, and thereby detects the position of an object or allows a driver to easily comprehend the position of an object existing around the vehicle.

For example, there is proposed a technology that applies bird's-eye view conversion to an image captured by an in-vehicle camera into an image (bird's-eye image) captured as if from a direction to look down at the vehicle, displays the image, and thereby allows a driver to easily comprehend positional relation between the vehicle and an object.

The technology assumes that the in-vehicle camera is installed on the vehicle at a correct installation position and at a correct installation angle. However, an installation error always occurs when the in-vehicle camera is installed. There is a need to eliminate an influence of the installation error by detecting installation positions and installation angles on all in-vehicle cameras at factory shipment of vehicles. The contents of a process on a captured image are optimized to eliminate an influence of the installation error on the assumption that each in-vehicle camera is installed on a vehicle at the installation position and the installation angle of the in-vehicle camera.

The installation position and/or the installation angle of the in-vehicle camera is detected or the amount of misalignment from the correct installation position and installation angle is detected to optimize the contents of a process on a captured image. This may be referred to as calibration of the in-vehicle camera.

The installation position or the installation angle of the in-vehicle camera may vary from the factory shipment condition, due to some reasons such as a vibration during vehicle travel or interference of the in-vehicle camera with something. In such a case, it is inconvenient to transport the vehicle to a maintenance factory and calibrate the in-vehicle camera. To solve this, there is proposed a technology (Patent Literature 1), in which capture regions for adjacent in-vehicle cameras partially overlap. If the installation position or installation angle of an in-vehicle camera changes from the factory shipment condition, the technology then calibrates the in-vehicle camera whose installation position or installation angle has changed, based on a captured image from an overlap region for the adjacent in-vehicle camera.

PRIOR ART LITERATURES

Patent Literature

Patent Literature 1: JP 2014-101075 A

SUMMARY OF INVENTION

However, the inventors of the present application examined the proposed technology and found that repeatedly calibrating an in-vehicle camera may degrade the calibration accuracy and may make it difficult to accurately recognize positions of objects around the vehicle. The reason is considered to be as follows. The description to follow uses an example of displaying a situation around the vehicle by applying bird's-eye view conversion to a captured image generated from a plurality of in-vehicle cameras.

Suppose one of in-vehicle cameras is subject to misalignment of the installation position or the installation angle with reference to the vehicle and requires calibration. In the following description, an in-vehicle camera to be calibrated is referred to as a "targeted camera" to be distinguished from the other in-vehicle cameras. The targeted camera can be correctly calibrated by overlapping bird's-eye images with each other in an overlap region with reference to a bird's-eye image from an adjacent in-vehicle camera if the adjacent in-vehicle camera keeps the installation position and the installation angle unchanged from the factory shipment.

However, the need to calibrate the targeted camera may involve a possibility that the installation position and the installation angle of the adjacent in-vehicle camera are also likely to be misaligned from the factory shipment condition. In this case, the targeted camera is calibrated based on the misaligned in-vehicle camera. An error of the in-vehicle camera used as a criterion propagates to the targeted camera. Obviously, a calibration process is also likely to cause an error.

Another in-vehicle camera may thereafter require the calibration. In such a case, an in vehicle camera adjacent to the targeted camera may have been calibrated before and an error may have propagated to the targeted camera at that time. In this case, the error also propagates to the targeted camera to be calibrated anew. A vibration during travel may cause an error after calibration of the in-vehicle camera used as a criterion. The error also propagates to the targeted camera.

Repeatedly calibrating in-vehicle cameras accumulates errors little by little and degrades the calibration accuracy. Consequently, it is considered to be difficult to accurately comprehend positions of objects around the vehicle.

It is an object of the present disclosure to provide a technology capable of calibration without degrading the accuracy even if an in-vehicle camera is repeatedly calibrated.

In an aspect of the present disclosure, there is provided an in-vehicle camera calibrator which is used for a vehicle mounted with a plurality of in-vehicle cameras attached so that capture regions of the in-vehicle cameras adjacent to each other partially overlap, and which calibrates at least one of an installation position and an installation angle of any of the in-vehicle cameras that has misalignment of the at least one of the installation position and the installation angle with reference to the vehicle. The in-vehicle camera calibrator comprises: a variation detector section that detects a variation from an initial state of at least one of an installation angle and an installation position of each of the in-vehicle cameras with reference to the vehicle; a targeted camera selector section that selects the in-vehicle camera indicating the variation greater than a predetermined threshold value as a targeted camera that requires the calibration; a criterial camera selector section that selects the in-vehicle camera indicating the smallest variation out of the in-vehicle cameras as a criterial camera when the targeted camera is selected from the in-vehicle cameras; an intermediate camera selector section that selects an intermediate camera when the intermediate camera exists, wherein the intermediate camera is the in-vehicle camera that intervenes between the targeted camera and the criterial camera; a first calibrator section that, when the intermediate camera is not selected, calibrates the targeted camera based on a captured image of an overlapping region where the capture regions of the criterial camera and the targeted camera overlap; and a second calibrator section that, when the intermediate camera is selected, calibrates the intermediate camera based on a captured image of an overlapping region where the capture regions of the criterial camera and the targeted camera overlap, and then calibrates the targeted camera based on a captured image of an overlapping region where the capture regions of the calibrated intermediate camera and the targeted camera overlap.

In another aspect of the present disclosure, there is provided an image generator which is used for a vehicle mounted with a plurality of in-vehicle cameras attached so that capture regions of the in-vehicle cameras adjacent to each other partially overlap, and which generates a monitoring image for monitoring a situation around the vehicle based on captured images acquired by the in-vehicle cameras. The image generator comprises: a captured image acquirer section that acquires the captured images from the in-vehicle cameras; a variation detector section that detects a variation from an initial state of at least one of an installation angle and an installation position of each of the in-vehicle cameras with reference to the vehicle; a targeted camera selector section that selects the in-vehicle camera indicating the variation greater than a predetermined threshold value as a targeted camera that requires calibrating the installation angle or the installation position; a criterial camera selector section that selects the in-vehicle camera indicating the smallest variation out of the in-vehicle cameras as a criterial camera when the targeted camera is selected from the in-vehicle cameras; an intermediate camera selector section that selects an intermediate camera when the intermediate camera exists, wherein the intermediate camera is the in-vehicle camera that intervenes between the targeted camera and the criterial camera; a first calibrator section that, when the intermediate camera is not selected, calibrates the targeted camera based on the captured image of an overlapping region where the capture regions of the criterial camera and the targeted camera overlap; a second calibrator section that, when the intermediate camera is selected, calibrates the intermediate camera based on the captured image of an overlapping region where the capture regions of the criterial camera and the intermediate camera overlap, and then calibrates the targeted camera based on the captured image of an overlapping region where the capture regions of the calibrated intermediate camera and the targeted camera overlap; and an image generator section that generates the monitoring image by applying visual line conversion to the captured images acquired from the in-vehicle cameras based on a result of calibrating the in-vehicle camera.

In yet another aspect of the present disclosure, there is an in-vehicle camera calibration method which is used for a vehicle mounted with a plurality of in-vehicle cameras attached so that capture regions of the in-vehicle cameras adjacent to each other partially overlap, and which calibrates one of an installation position and an installation angle of any of the in-vehicle cameras that has misalignment of one of an installation position and an installation angle with reference to the vehicle. The method comprises: detecting a variation from an initial state of one of an installation angle and an installation position of each of the in-vehicle cameras with reference to the vehicle; selecting the in-vehicle camera indicating the variation greater than a predetermined threshold value as a targeted camera that requires the calibration; selecting the in-vehicle camera indicating the smallest variation out of the in-vehicle cameras as a criterial camera when the targeted camera is selected from the in-vehicle cameras; selecting an intermediate camera when the intermediate camera exists, wherein the intermediate camera is the in-vehicle camera that intervenes between the targeted camera and the criterial camera; when the intermediate camera is not selected, calibrating the targeted camera based on a captured image of an overlapping region where the capture regions of the criterial camera and the targeted camera overlap; and, when the intermediate camera is selected, calibrating the intermediate camera based on a captured image of an overlapping region where the capture regions of the criterial camera and the intermediate camera overlap, and then calibrating the targeted camera based on a captured image of an overlapping region where the capture regions of the calibrated intermediate camera and the targeted camera overlap.

In yet another aspect of the present disclosure, there is provided an image generation method which is used for a vehicle mounted with a plurality of in-vehicle cameras attached so that capture regions the in-vehicle cameras adjacent to each other partially overlap, and which generates a monitoring image for monitoring a situation around the vehicle based on captured images acquired by the in-vehicle cameras. The method comprises: acquiring the captured images from the in-vehicle cameras; detecting a variation from an initial state of at least one of an installation angle and an installation position of each of the in-vehicle cameras with reference to the vehicle; selecting the in-vehicle camera indicating the variation greater than a predetermined threshold value as a targeted camera that requires calibrating the installation angle or the installation position; selecting the in-vehicle camera indicating the smallest variation out of the in-vehicle cameras as a criterial camera when the targeted camera is selected from the in-vehicle cameras; selecting an intermediate camera when the intermediate camera exists, wherein the intermediate camera is the in-vehicle camera that intervenes between the targeted camera and the criterial camera; when the intermediate camera is not selected, calibrating the targeted camera based on the captured image of an overlapping region where the capture regions of the criterial camera and the targeted camera overlap; when the intermediate camera is selected, calibrating the intermediate camera based on the captured image of an overlapping region where the capture regions of the criterial camera and the intermediate camera overlap, and then calibrating the targeted camera based on the captured image of an overlapping region where the capture regions of the calibrated intermediate camera and the targeted camera overlap; and generating the monitoring image by applying visual line conversion to the captured image acquired from the in-vehicle cameras based on the result of calibrating the in-vehicle camera.

The in-vehicle camera calibrator, the image generator, the in-vehicle camera calibration method, and the image generation method described above can calibrate not only the targeted camera by using the criterial camera, but also calibrate the intermediate camera, if selected, by using the criterial camera. Suppose at least one of the criterial cameras, the targeted camera, and the intermediate camera most recently calibrated keeps the installation position and the installation angle unchanged when the calibration is required next time. In this case, the calibration is available with the same accuracy as the previous calibration by selecting that in-vehicle camera as the criterial camera. The result is to be able to prevent the repeated calibration from degrading the accuracy.

BRIEF DESCRIPTION OF DRAWINGS

The foregoing and other objects, features, and advantages of the disclosure will become more apparent from the detailed description given below with reference to the accompanying drawings in which.

EMBODIMENTS FOR CARRYING OUT INVENTION

An embodiment of the present disclosure will be described.

A. Apparatus Configuration

Figure 1:
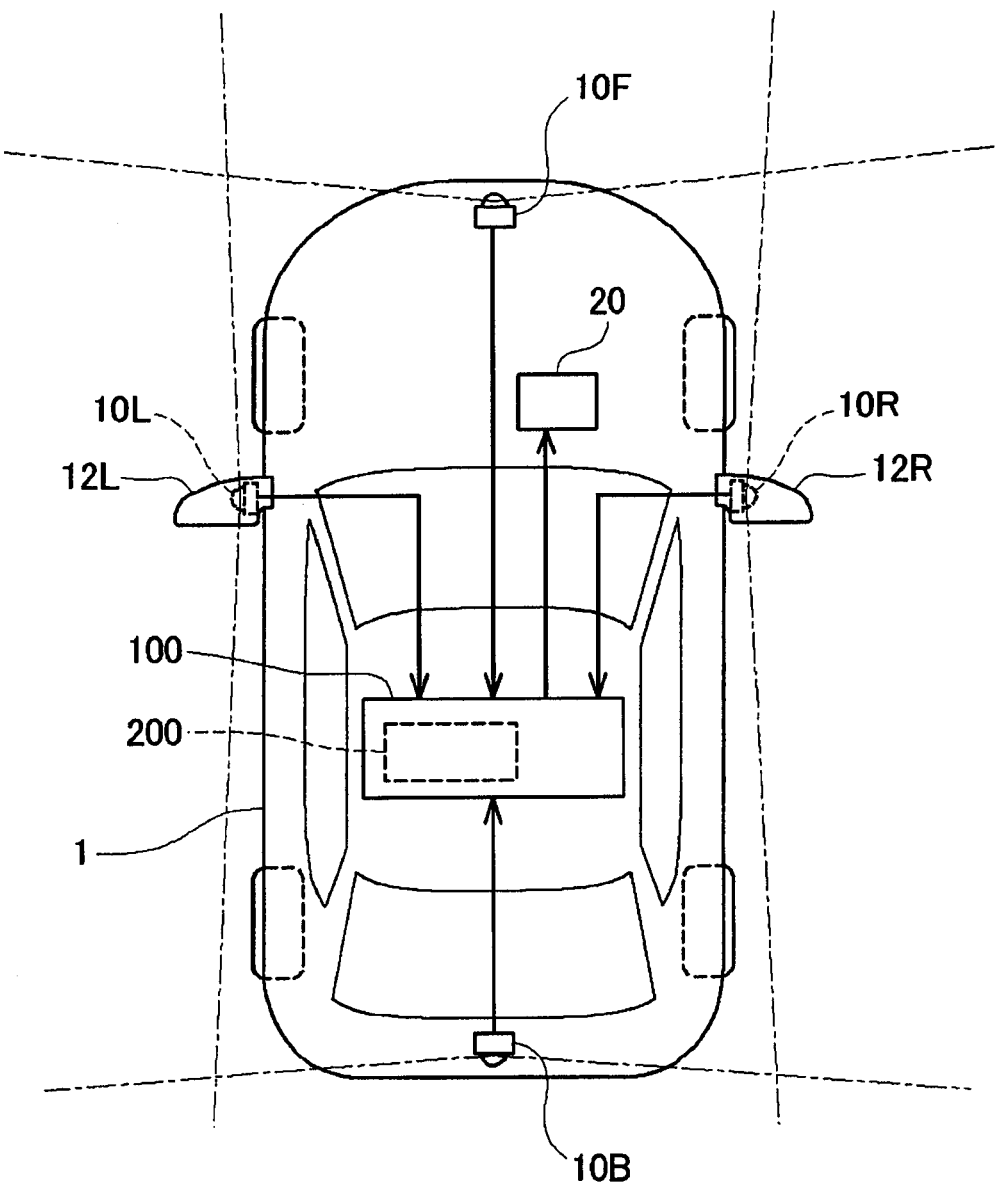
FIG. 1 is an explanatory diagram illustrating a vehicle mounted with an image generator and an in-vehicle camera calibrator according to an embodiment.

FIG. 1 illustrates a vehicle 1 mounted with an image generator 100 (and an in-vehicle camera calibrator 200) according to the embodiment. As illustrated in FIG. 1, the vehicle 1 is mounted with a plurality of (four in the drawing) in-vehicle cameras 10F, 10B, 10L, and 10R, the image generator 100 (and the in-vehicle camera calibrator 200), and a display screen 20.

The image generator 100 (and the in-vehicle camera calibrator 200) represents a microcomputer including a CPU as a main part, a memory module, a timer, and an input/output peripheral unit that are connected via a bus so as to be capable of communicating data with each other. The image generator 100 receives captured images from the in-vehicle cameras 10F, 10B, 10L, and 10R, performs a predetermined process (to be described later) to generate a monitoring image, and then outputs the image to the display screen 20 such as a liquid crystal display.

Figure 2:
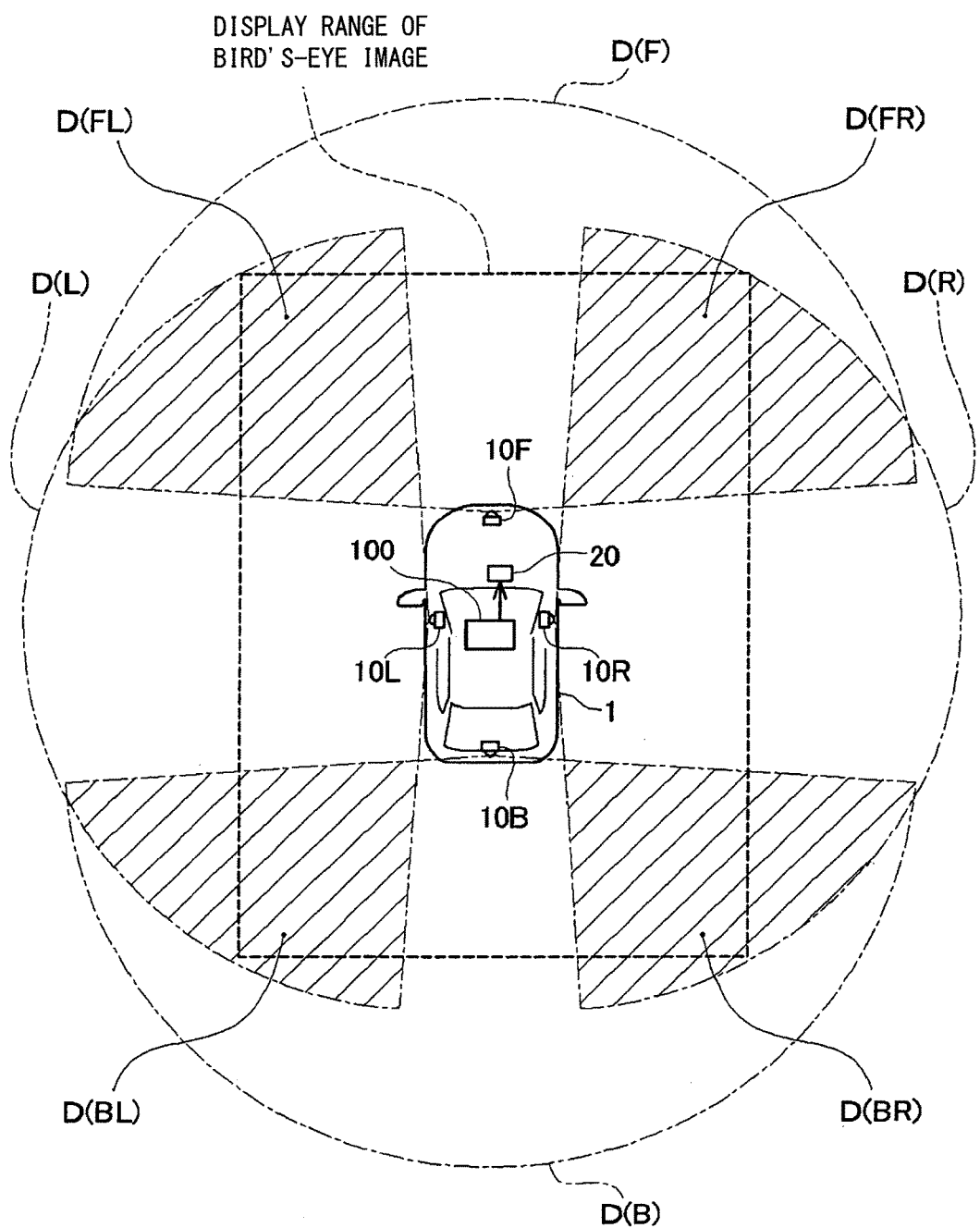
FIG. 2 is an explanatory diagram conceptually illustrating capture regions of a plurality of in-vehicle cameras mounted on a vehicle.

FIG. 2 conceptually illustrates mounting positions and capture regions of the in-vehicle cameras 10F, 10B, 10L, and 10R. The in-vehicle camera 10F is mounted on the top of a front bumper of the vehicle 1 and captures capture region D (F) ahead of the vehicle 1. The in-vehicle camera 10B is mounted on the top of a rear bumper of the vehicle 1 and captures capture region D (B) behind the vehicle 1. The in-vehicle camera 10L is mounted on the bottom surface of a left door mirror 12L of the vehicle 1 and captures capture region D (L) to the left of the vehicle 1. The in-vehicle camera 10R is mounted on the bottom surface of a right door mirror 12R of the vehicle 1 and captures capture region D (R) to the right of the vehicle 1.

The in-vehicle cameras 10F, 10B, 10L, and 10R each include a wide-angle lens such as a fish-eye lens and can capture a wide angle range. As illustrated in FIG. 2, capture region D (F) for the in-vehicle camera 10F and capture region D (R) for the in-vehicle camera 10R partially overlap in region D (FR). Capture region D (F) for the in-vehicle camera 10F and capture region D (L) for the in-vehicle camera 10L partially overlap in region D (FL). Similarly, capture region D (B) for the in-vehicle camera 10B and capture region D (R) for the in-vehicle camera 10R partially overlap in region D (BR). Capture region D (B) for the in-vehicle camera 10B and capture region D (L) for the in-vehicle camera 10L partially overlap in region D (BL). Concatenating captured images from the in-vehicle cameras 10F, 10B, 10L, and 10R can generate a captured image in all directions of the vehicle 1.

The image generator 100 according to the embodiment applies visual line conversion to the captured images to generate a visual-line converted image. The image generator 100 generates a monitoring image to monitor around the vehicle 1 from the visual-line converted image and outputs the monitoring image to the display screen 20. The "visual line conversion" here signifies a process that converts a captured image from the in-vehicle camera into an image as if captured from a direction different from the actual capture direction. The process can perform the visual line conversion to generate an image captured as if from a direction to view the vehicle 1 directly downward (or obliquely downward). This process is also referred to as "bird's-eye view conversion." The "visual-line converted image" results from applying the visual line conversion to a captured image. A "bird's-eye image" results from applying the bird's-eye view conversion to a captured image.

In the following description, a bird's-eye image is generated by applying the bird's-eye view conversion to a captured image for the purpose of illustration. The description can be therefore generalized by replacing "bird's-eye view conversion" with "visual line conversion."

In FIG. 2, a broken-line rectangle illustrates the display range of a bird's-eye image displayed on the display screen 20. A driver can easily comprehend a surrounding situation if the bird's-eye view conversion is applied to a captured image from the in-vehicle camera to display the image.

The bird's-eye view conversion needs to be correctly applied to a bird's-eye image to be displayed on the display screen 20 so as to reflect the actual situation in order that the driver can correctly comprehend a situation around the vehicle 1. For this purpose, installation positions and installation angles of the in-vehicle cameras 10F, 10B, 10L, and 10R based on the vehicle 1 need to be unchanged from installation positions and installation angles preconditioned for the bird's-eye view conversion.

Obviously, installation positions or installation angles of the in-vehicle cameras 10F, 10B, 10L, and 10R may be misaligned for some reasons after factory shipment of the vehicle 1. There is also proposed a technology to calibrate the in-vehicle cameras 10F, 10B, 10L, and 10R if installation positions or installation angles of the in-vehicle cameras 10F, 10B, 10L, and 10R are misaligned. The "in-vehicle camera calibration" here signifies detecting an installation position or an installation angle of the in-vehicle camera based on the vehicle or detecting the amount of misalignment from the correct installation position or installation angle and appropriately applying the bird's-eye view conversion to a captured image based on the result.

However, repeating the in-vehicle camera calibration cannot perform the bird's-eye view conversion correctly. As a result, the driver cannot easily comprehend a situation around the vehicle. The image generator 100 (and the in-vehicle camera calibrator 200) according to the embodiment is specially configured as follows in order to be able to correctly perform the bird's-eye view conversion even if the in-vehicle camera is repeatedly calibrated.

Figure 3:
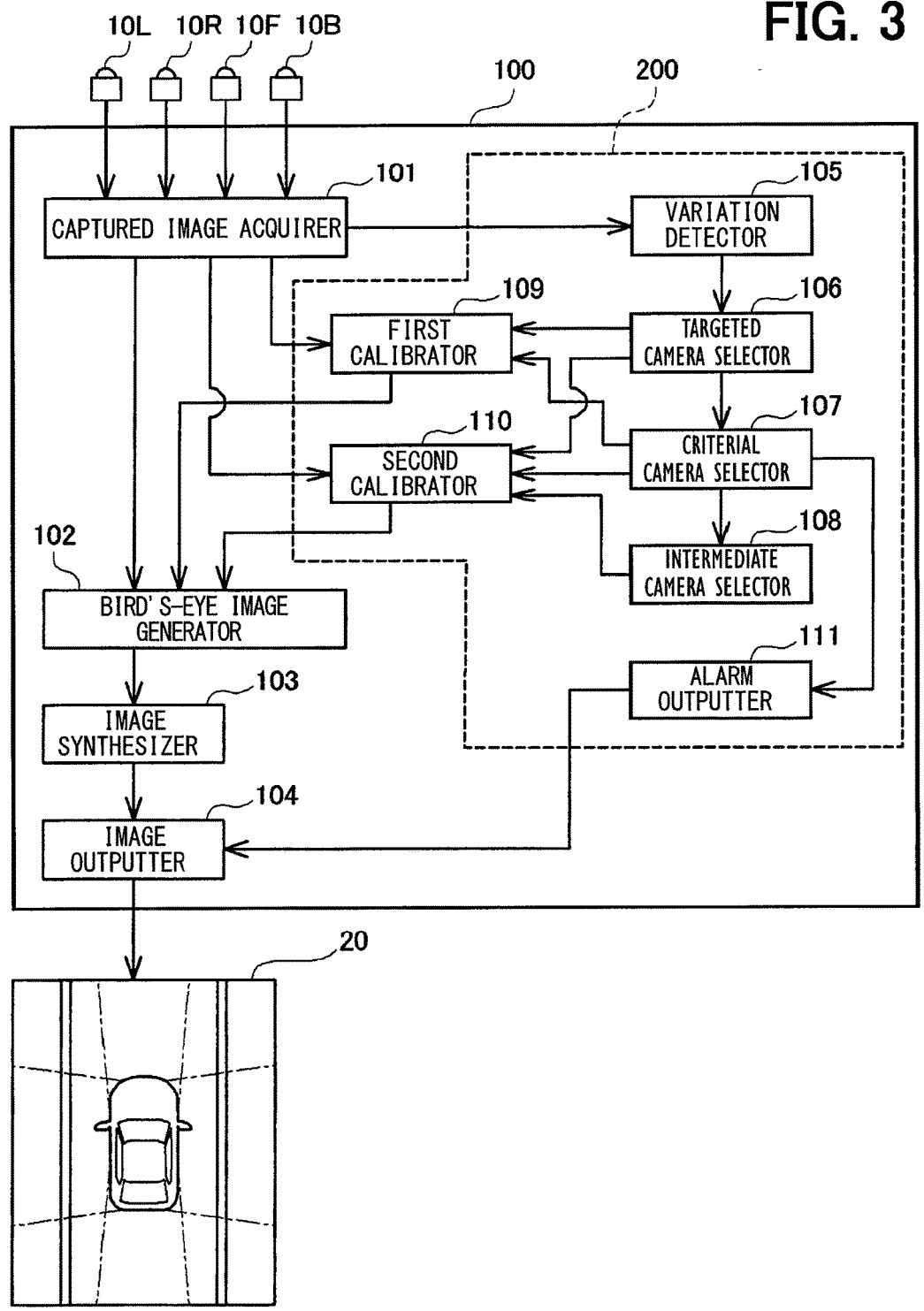
FIG. 3 is an explanatory diagram schematically illustrating an internal configuration of an image generator and an in-vehicle camera calibrator 200.

FIG. 3 schematically illustrates an internal configuration of the image generator 100 (and the in-vehicle camera calibrator 200) according to the embodiment. As illustrated in the drawing, the image generator 100 includes a captured image acquirer section 101, a bird's-eye image generator section 102, an image synthesizer section 103, an image outputter section 104, a variation detector section 105, a targeted camera selector section 106, a criterial camera selector section 107, an intermediate camera selector section 108, a first calibrator section 109, a second calibrator section 110, and an alarm outputter section 111.

These eleven "sections" classify the internal configuration of the image generator 100 for descriptive purposes in terms of a function of the image generator 100 to output an image to monitor around the vehicle 1 and do not signify that the image generator 100 is physically divided into these "sections." The "sections" can be implemented as a computer program running on the CPU, as an electronic circuit including LSI and memory, or as a combination of these. The computer program may be provided as a non-volatile storage medium to store the computer program or may be provided via an electric communication line.

The variation detector section 105, the targeted camera selector section 106, the criterial camera selector section 107, the intermediate camera selector section 108, the first calibrator section 109, the second calibrator section 110, and the alarm outputter section 111 in the image generator 100 correspond to the "in-vehicle camera calibrator 200."

As illustrated in FIG. 3, the captured image acquirer section 101 is connected to the in-vehicle cameras 10F, 10B, 10L, and 10R and acquires captured images from the in-vehicle cameras 10F, 10B, 10L, and 10R.

The bird's-eye image generator section 102 acquires captured images captured by the in-vehicle cameras 10F, 10B, 10L, and 10R from the captured image acquirer section 101 and applies bird's-eye view conversion to each captured image to generate a bird's-eye image. The image synthesizer section 103 synthesizes a monitoring image displayed on the display screen 20 by using the bird's-eye images generated by the bird's-eye image generator section 102. The image outputter section 104 outputs the monitoring image synthesized by the image synthesizer section 103 to the display screen 20.

The captured image acquirer section 101 also outputs captured images captured by the in-vehicle cameras 10F, 10B, 10L, and 10R to the variation detector section 105. The variation detector section 105 acquires the captured images captured by the in-vehicle cameras 10F, 10B, 10L, and 10R from the captured image acquirer section 101 and then detects variations in installation positions and installation angles of the in-vehicle cameras 10F, 10B, 10L, and 10R based on the vehicle 1 by using a method to be described later.

The targeted camera selector section 106 selects a "targeted camera" to be calibrated from the in-vehicle cameras 10F, 10B, 10L, and 10R on condition that the targeted camera exceeds a predetermined threshold value.

When selecting the targeted camera, the criterial camera selector section 107 selects a "criterial camera" used as a calibration criterion from the in-vehicle cameras 10F, 10B, 10L, and 10R on condition that the criterial camera indicates the smallest variation.

The targeted camera and the criterial camera may not be adjacent to each other. In this case, an in-vehicle camera existing between the targeted camera and the criterial camera is selected as an "intermediate camera." The example in FIG. 2 illustrates that the targeted camera corresponds to the in-vehicle camera 10B and the criterial camera corresponds to the in-vehicle camera 10F. In this case, the in-vehicle camera 10L or 10R is selected as the intermediate camera.

No intermediate camera is selected when the targeted camera and the criterial camera are adjacent to each other. In this case, the first calibrator section 109 calibrates the targeted camera by using a captured image from the criterial camera.

The first calibrator section 109 acquires information to specify the targeted camera from the targeted camera selector section 106 and acquires information to specify the criterial camera from the criterial camera selector section 107. The first calibrator section 109 acquires captured images for the criterial camera and the targeted camera from the captured image acquirer section 101.

The first calibrator section 109 acquires information by calibrating the targeted camera and outputs the acquired information to the bird's-eye image generator section 102.

An intermediate camera is selected when the targeted camera and the criterial camera are not adjacent to each other. In this case, the second calibrator section 110 calibrates the intermediate camera by using a captured image for the criterial camera and then calibrates the targeted camera by using a captured image for the intermediate camera.

Information to specify the targeted camera and the criterial camera is acquired from the targeted camera selector section 106 and the criterial camera selector section 107. Information to specify the intermediate camera is acquired from the intermediate camera selector section 108. Captured images for the criterial camera, the intermediate camera, and the targeted camera are acquired from the captured image acquirer section 101.

The second calibrator section 110 outputs the information acquired by calibrating the intermediate camera and the information acquired by calibrating the targeted camera to the bird's-eye image generator section 102.

Suppose a large variation is detected from an in-vehicle camera selected as the criterial camera and sufficient calibration accuracy is not ensured even if the first calibrator section 109 or the second calibrator section 110 calibrates the other in-vehicle cameras. In this case, the alarm outputter section 111 allows the image outputter section 104 to previously output an alarm to the display screen 20 in order to notify that a variation of the in-vehicle camera selected as the criterial camera is compared with a predetermined tolerance and the variation of the criterial camera is larger than the tolerance.

The bird's-eye image generator section 102 receives information about a result of calibrating the in-vehicle camera from the first calibrator section 109 or the second calibrator section 110 and then reflects the information on the subsequent bird's-eye view conversion. For example, the bird's-eye image generator section 102 receives a result of calibrating the targeted camera from the first calibrator section 109 and reflects the information on the subsequent bird's-eye view conversion to be applied to captured images from the targeted camera. The bird's-eye image generator section 102 receives result of calibrating the targeted camera and the intermediate camera from the second calibrator section 110 and reflects the information on the subsequent bird's-eye view conversion to be applied to captured images from the targeted camera and the intermediate camera.

This can enable the calibration without degrading the accuracy even if the in-vehicle cameras 10F, 10B, 10L, and 10R are repeatedly calibrated. The description below explains an image generation process that generates an image (displayed on the display screen 20) for the image generator 100 to monitor around the vehicle 1. The description also explains why the accuracy does not degrade even if the in-vehicle cameras 10F, 10B, 10L, and 10R are repeatedly calibrated.

B. Image Generation Process

Figure 4:
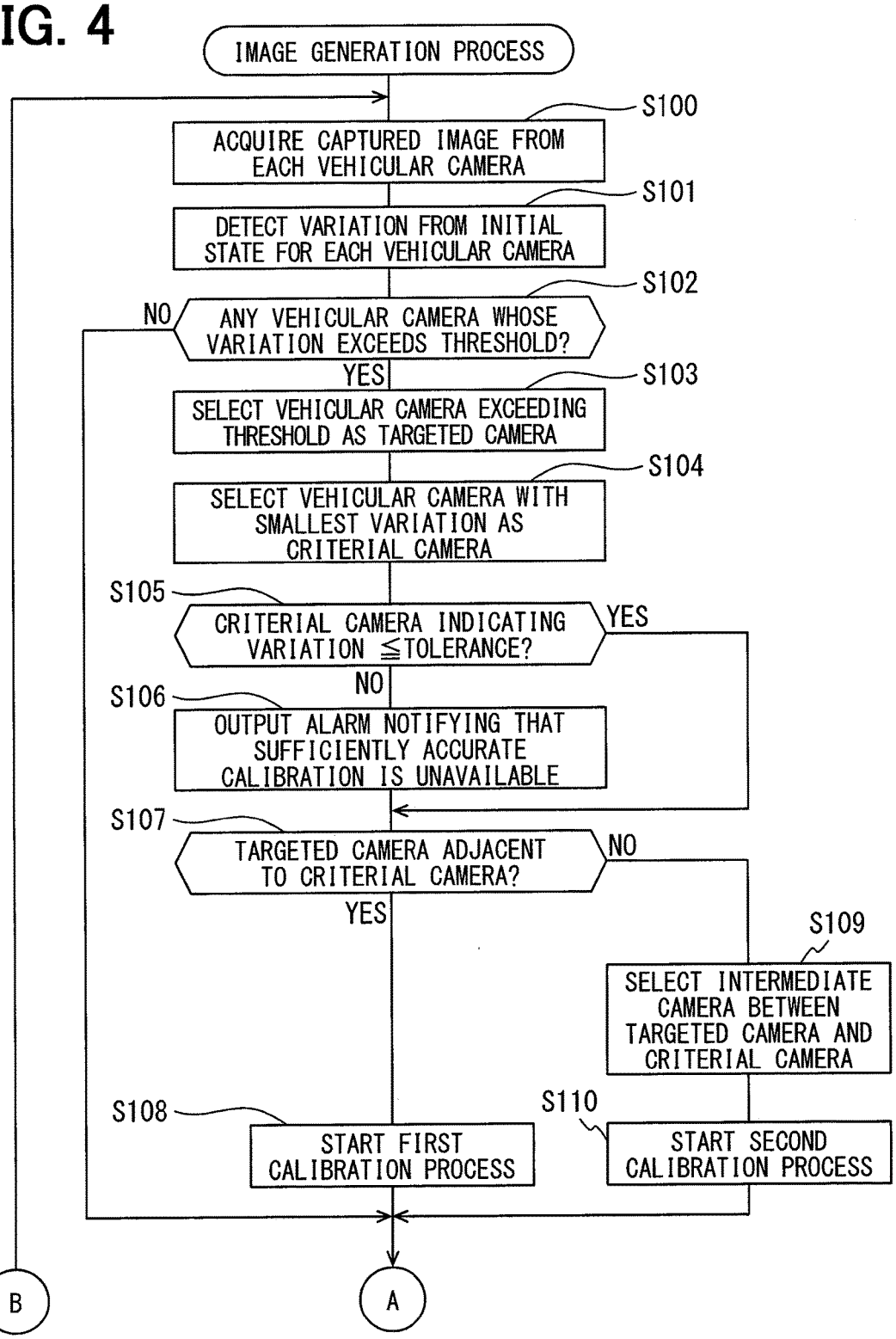
FIG. 4 is a flowchart illustrating a first part of an image generation process to generate an image for the image generator to monitor surroundings of a vehicle.
Figure 5:
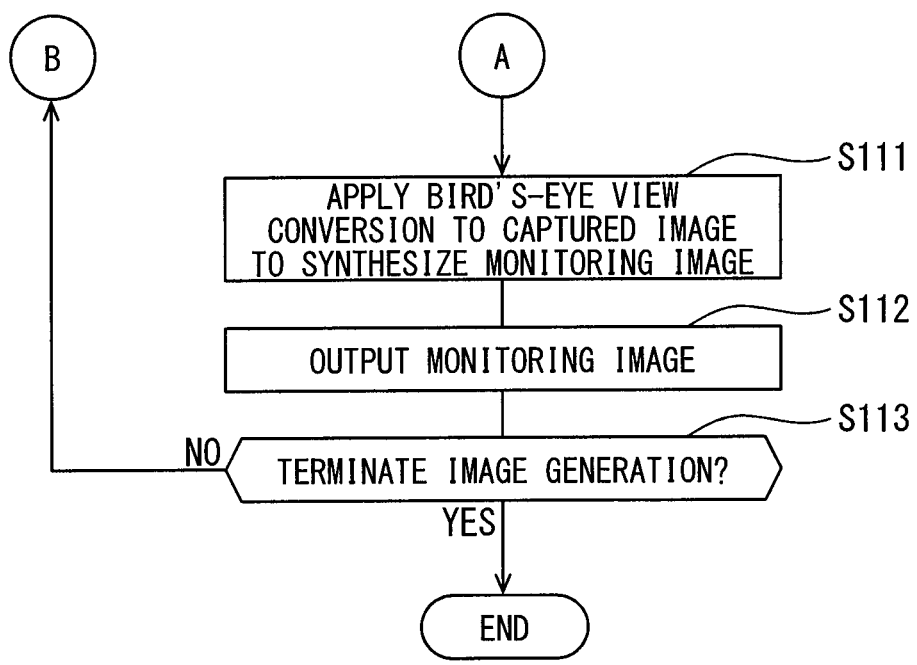
FIG. 5 is a flowchart illustrating a second part of the image generation process.

FIGS. 4 and 5 depict a flowchart illustrating the image generation process for the image generator 100 according to the embodiment to generate an image to be displayed on the display screen 20.

As illustrated in the drawing, the image generation process first acquires captured images from the in-vehicle cameras 10F, 10B, 10L, and 10R (S100).

The process detects an index (variation) representing the amount of misalignment, namely, changes in the installation position and the installation angle based on the vehicle 1 from the initial state at the factory shipment in each of the in-vehicle cameras 10F, 10B, 10L, and 10R (S101). Various methods can be used to detect variations in the in-vehicle cameras 10F, 10B, 10L, and 10R. The embodiment simply uses the following method to detect variations.

Figure 6:
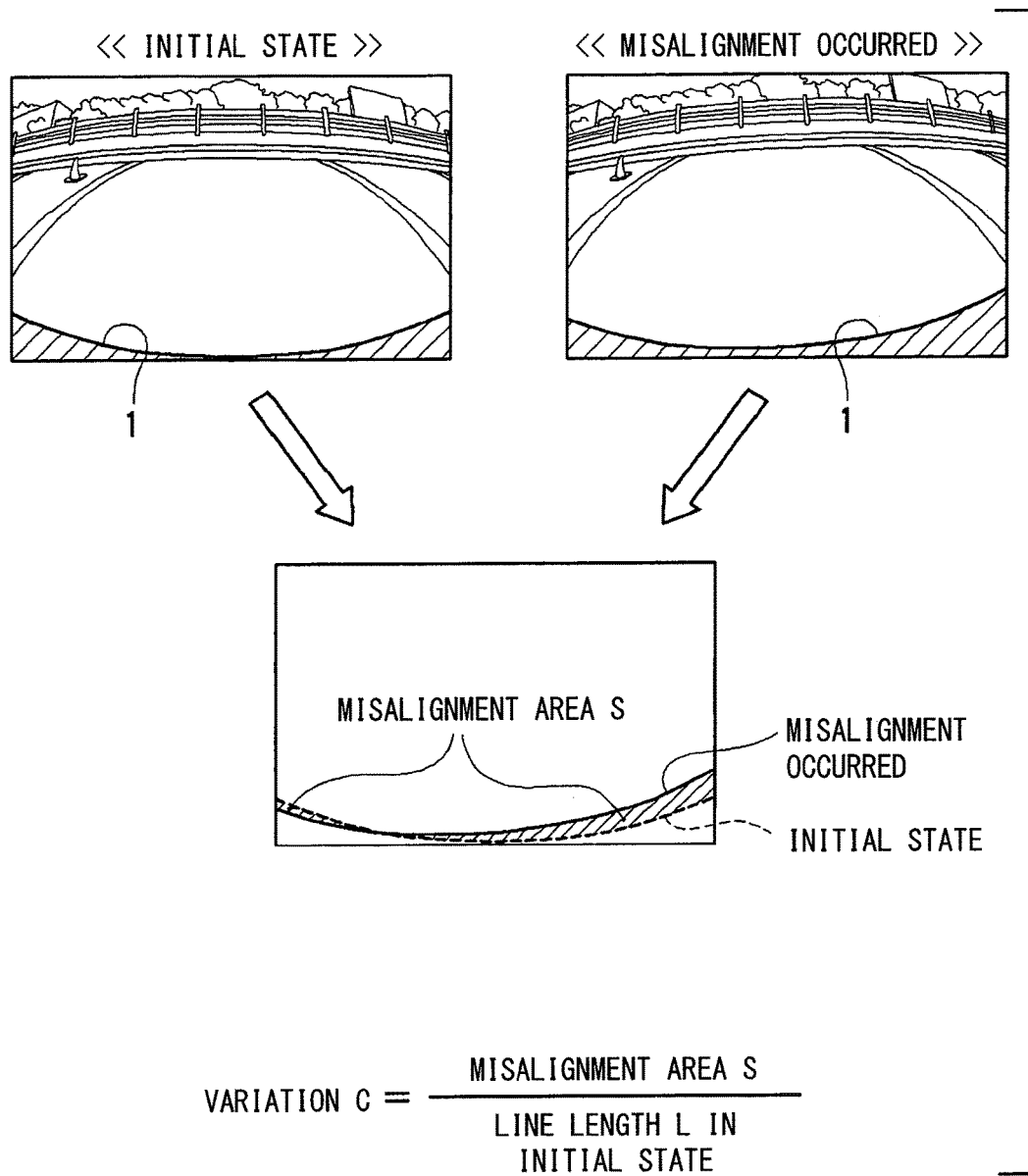
FIG. 6 is an explanatory diagram illustrating a variation to be detected to determine whether an installation position and an installation angle of an in-vehicle camera change from an initial state.

FIG. 6 illustrates how the image generator 100 (and the in-vehicle camera calibrator 200) according to the embodiment detects variations in the in-vehicle cameras 10F, 10B, 10L, and 10R. As above, the in-vehicle cameras 10F, 10B, 10L, and 10R include wide-angle lenses. A resulting captured image includes part of the vehicle 1 as an initial state illustrated in FIG. 6. The position of the vehicle 1 included in the captured image changes correspondingly to a change in at least one of the installation position and the installation angle of the in-vehicle cameras 10F, 10B, 10L, and 10R based on the vehicle 1. FIG. 6 illustrates the misalignment occurred when the position of vehicle 1 included in the captured image changes due to a change in the installation position or the installation angle.

The process stores the contour position of the vehicle 1 included in the captured image (illustrated in FIG. 6) as the initial state corresponding to the factory shipment of the vehicle 1. The process stores the contour position of the vehicle 1 in the captured image from each of the in-vehicle cameras 10F, 10B, 10L, and 10R. The process thereafter acquires a captured image, if available, detects a contour position of the vehicle 1 included in the captured image, and compares the contour position with the position stored as the initial position.

FIG. 6 illustrates the contour position stored as the initial state (broken line in the drawing) compared with a subsequently detected contour position (solid line in the drawing)

of the vehicle 1. In FIG. 6, misalignment area S (hatched in the drawing) is surrounded by the broken line representing the initial state and the solid line representing the subsequently detected contour and corresponds to the amount of misalignment occurred in the installation position and the installation angle based on the vehicle 1.

Misalignment area S tends to increase as the contour of the vehicle 1 included in the captured image lengthens. The process stores line length L of the contour in the initial state and divides misalignment area S by line length L of the contour to calculate variation C (see a formula in FIG. 6). Different contour lengths are included in captured images from the in-vehicle cameras 10F, 10B, 10L, and 10R. However, calculating variation C can compare amounts of misalignment regardless of contour lengths of the vehicle 1 included in captured images.

The method described here uses the contour of the vehicle 1 included in the captured image to detect variation C in each of the in-vehicle cameras 10F, 10B, 10L, and 10R. However, the method of detecting variation C is not limited thereto. A more direct method may be used to detect variation C by attaching a more accurate position sensor to each of the in-vehicle cameras 10F, 10B, 10L, and 10R, for example.

As above, the process detects variation C in each of the in-vehicle cameras 10F, 10B, 10L, and 10R (S101 in FIG. 4). The process then determines whether there is an in-vehicle camera whose variation C exceeds a predetermined threshold value (S102).

The process then may determine that there does not exist an in-vehicle camera whose variation C exceeds a predetermined threshold value (S102: no). In this case, the calibration is considered to be unnecessary for each of the in-vehicle cameras 10F, 10B, 10L, and 10R. The process applies the bird's-eye view conversion to the captured images acquired from the in-vehicle cameras 10F, 10B, 10L, and 10R and synthesizes the converted bird's-eye images to generate an image (monitoring image) to be displayed on the display screen 20 (S111).

The process outputs the synthesized monitoring image to the display screen 20 (S112) and then determines whether to terminate the image generation (S113). The process may determine that the image generation does not terminate (S113: no). In this case, the process returns to the beginning and again acquires a captured image (S100). The process detects variation C in each of the in-vehicle cameras 10F, 10B, 10L, and 10R (S101) and determines whether there is an in-vehicle camera whose variation C exceeds a predetermined threshold value (S102).

A sequence of the above-mentioned process is repeated until the process is determined to terminate (S113: yes) on condition that variation C does not exceed a predetermined threshold value in any of the in-vehicle cameras 10F, 10B, 10L, and 10R.

In contrast, an in-vehicle camera is supposed to require calibration if variation C exceeds a predetermined threshold value in any of the in-vehicle cameras 10F, 10B, 10L, and 10R (S102: yes).

The process selects a "targeted camera" to be calibrated on condition that the targeted camera corresponds to an in-vehicle camera whose variation C exceeds a predetermined threshold value (S103). The process then selects a "criterial camera" used as a calibration criterion on condition that the criterial camera indicates smallest variation C in the in-vehicle cameras 10F, 10B, 10L, and 10R (S104).

Though unrealistic, variation C may exceed the threshold value simultaneously in two or more in-vehicle cameras. In such a case, a targeted camera is selected on condition that the targeted camera indicates largest variation C in the in-vehicle cameras. Variation C may still exceed the threshold value in an in-vehicle camera not selected as the targeted camera after the targeted camera is calibrated based on a method to be described later. In such a case, that in-vehicle camera may be selected as a targeted camera anew.

The process determines whether the in-vehicle camera selected as a criterial camera indicates the variation smaller than or equal to a predetermined tolerance (S105). The variation of the criterial camera may exceed the tolerance (S105: no). In this case, sufficient calibration accuracy is supposed to be unavailable even if the targeted camera is calibrated by using the criterial camera as a criterion. The process then notifies a driver of this situation by displaying a suitable alarm on the display screen 20 (S106). Alternatively, the process may outputs an audio announcing that sufficient calibration accuracy is unavailable. The alarm output can help the driver to correctly re-calibrate the in-vehicle camera by transporting the vehicle 1 to a maintenance factory.

No alarm is output if the variation of the criterial camera does not exceed the tolerance (S105: yes).

Figure 7A:
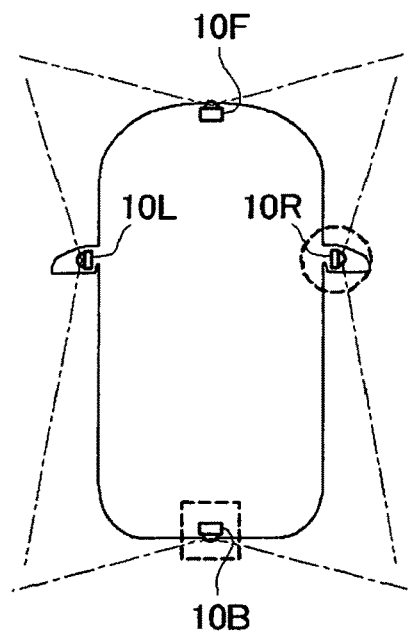
FIG. 7A is an explanatory diagram illustrating a mode to select a targeted camera and a criterial camera.

The process then determines whether the in-vehicle camera selected as the targeted camera is adjacent to the in-vehicle camera selected as the criterial camera (S107). As illustrated in FIG. 7A, for example, the process determines that the targeted camera is adjacent to the criterial camera when the in-vehicle camera 10B is selected as the targeted camera and the in-vehicle camera 10R is selected as the criterial camera.

A broken-line rectangle surrounding the in-vehicle camera 10B in the drawing indicates that the in-vehicle camera 10B is selected as the targeted camera. A broken-line circle surrounding the in-vehicle camera 10R in the drawing indicates that the in-vehicle camera 10R is selected as the criterial camera.

Figure 7B:
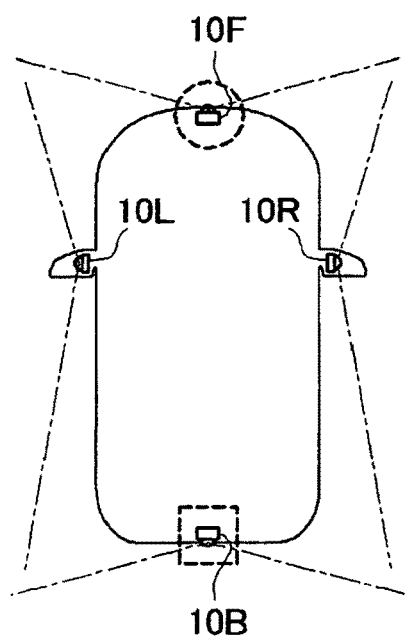
FIG. 7B is an explanatory diagram illustrating a mode to select a targeted camera and a criterial camera.

As illustrated in FIG. 7B, the process determines that the targeted camera is not adjacent to the criterial camera when the in-vehicle camera 10B is selected as the targeted camera and the in-vehicle camera 10F is selected as the criterial camera.

As above, the process determines whether the targeted camera is adjacent to the criterial camera (S107 in FIG. 4). The process may determine that the targeted camera is adjacent to the criterial camera (S107: yes). The process then starts a first calibration process (S108). As will be described in detail later, the first calibration process is started in the above-mentioned image generation process and calibrates a targeted camera in parallel with the image generation process.

The process may determine that the targeted camera is not adjacent to the criterial camera (S107: no). The process then selects an in-vehicle camera existing between the targeted camera and the criterial camera as an intermediate camera (S109). According to the example in FIG. 7B, the process selects the in-vehicle camera 10L or the in-vehicle camera 10R as the intermediate camera.

According to the embodiment, the vehicle 1 is mounted with the four in-vehicle cameras 10F, 10B, 10L, and 10R. Therefore, one in-vehicle camera (intermediate camera) always exists between the targeted camera and the criterial camera when the targeted camera and the criterial camera are not adjacent to each other. However, the number of in-vehicle cameras selected as the intermediate camera is not limited to one.

Figure 8A:
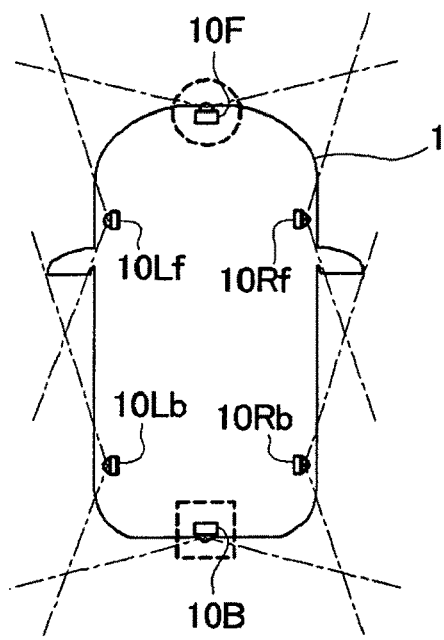
FIG. 8A is an explanatory diagram illustrating another mode to select a targeted camera and a criterial camera.

As illustrated in FIG. 8A, for example, suppose the vehicle 1 is mounted with six in-vehicle cameras, the in-vehicle camera 10B is selected as the targeted camera, and the in-vehicle camera 10F is selected as the criterial camera. In this case, the selected intermediate cameras are two cameras such as the in-vehicle camera 10Rf and the in-vehicle camera 10Rb mounted at the right of the vehicle 1 or two cameras such as the in-vehicle camera 10Lf and the in-vehicle camera 10Lb mounted at the left of the vehicle 1.

Figure 8B:
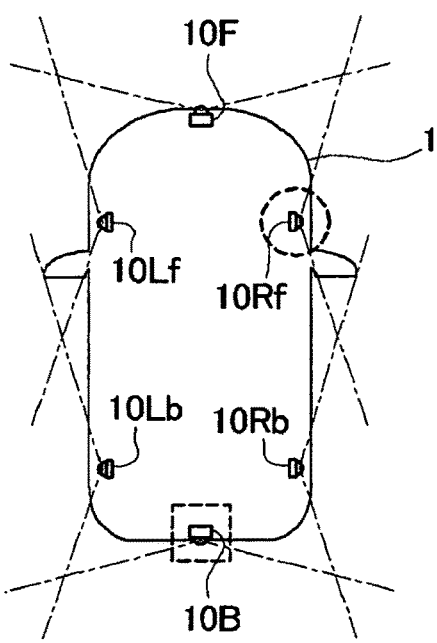
FIG. 8B is an explanatory diagram illustrating another mode to select a targeted camera and a criterial camera.

As illustrated in FIG. 8B, suppose the in-vehicle camera 10B is selected as the targeted camera, and the in-vehicle camera 10Rf is selected as the criterial camera. In this case, one in-vehicle camera (in-vehicle camera 10Rb) can be selected as the intermediate camera. Three in-vehicle cameras, namely, the in-vehicle camera 10F, the in-vehicle camera 10Lf, and the in-vehicle camera 10Lb can be selected as the intermediate cameras.

When focusing on fast calibrating the targeted camera, it is favorable to select an intermediate camera so as to decrease the number of in-vehicle cameras to be selected. When focusing on preventing the accuracy from degrading despite repeated calibration, it is favorable to select an intermediate camera so as to increase the number of in-vehicle cameras to be selected. The reason will be described in detail later.

The process starts a second calibration process (S110) after selecting the intermediate camera. As will be described in detail later, the second calibration process is also started in the above-mentioned image generation process and calibrates a targeted camera in parallel with the image generation process.

C. First Calibration Process

Figure 9:
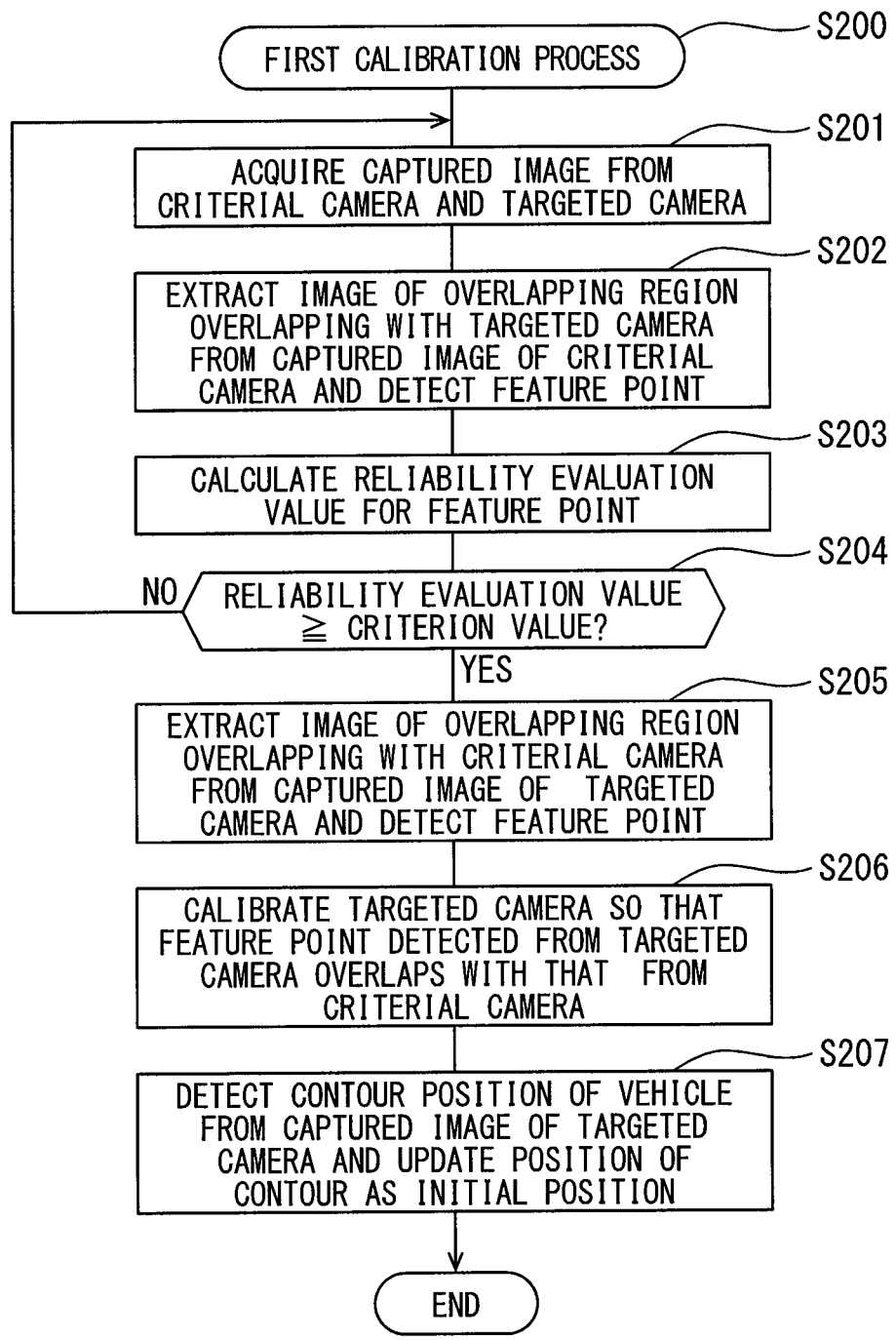
FIG. 9 is a flowchart illustrating a first calibration process to calibrate a targeted camera based on a criterial camera when the criterial camera and the targeted camera are adjacent to each other.

FIG. 9 is a flowchart illustrating the first calibration process. As above, the first calibration process starts when the targeted camera and the criterial camera selected by the image generation process in FIG. 4 are adjacent in-vehicle cameras. The image generator 100 (and the in-vehicle camera calibrator 200) performs the first calibration process.

The first calibration process starts (S200). The process acquires a captured image from an in-vehicle camera selected as the criterial camera and a captured image from an in-vehicle camera selected as the targeted camera from the captured image acquirer section 101 (S201).

Based on the example in FIG. 7A, the description below assumes that the criterial camera corresponds to the in-vehicle camera 10R and the targeted camera corresponds to the in-vehicle camera 10B.

The captured image from the criterial camera includes a region image where the capture region overlaps with the targeted camera. The process extracts the overlapping region image and detects a feature point from the image (S202).

Figure 10A:
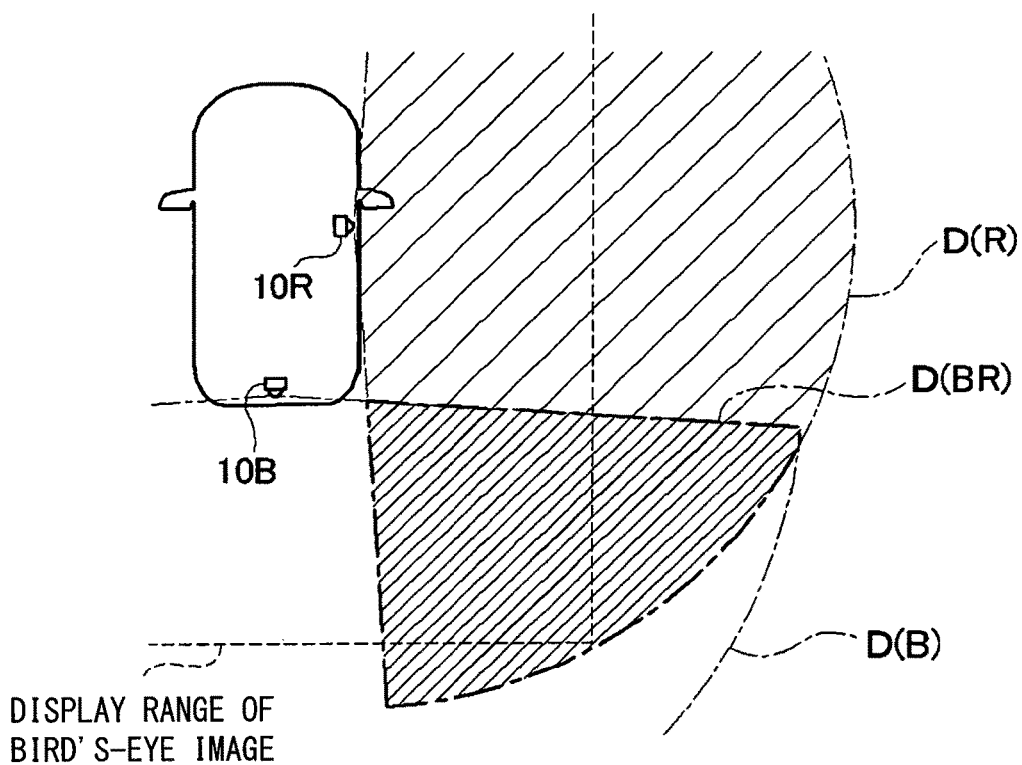
FIG. 10A is an explanatory diagram illustrating an example of extracting an image of an overlap region overlapping with the targeted camera from captured images captured by the criterial camera.
Figure 10B:
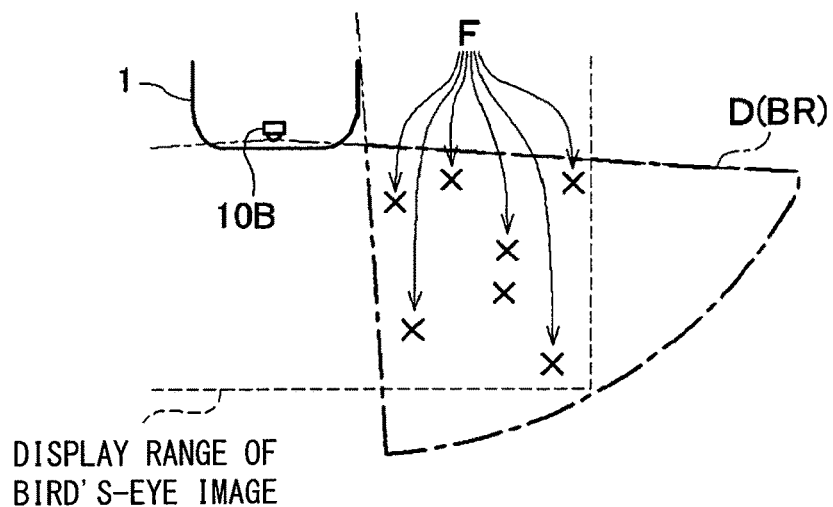
FIG. 10B is an explanatory diagram illustrating an example of extracting an image of the overlap region and detecting a feature point.

The in-vehicle camera 10R is assumed to be the criterial camera. The in-vehicle camera 10B is assumed to be the targeted camera. As illustrated in FIG. 10A, capture region D (R) for the in-vehicle camera 10R overlaps with capture region D (B) for the in-vehicle camera 10B at region D (BR). The process extracts an image of region D (BR) from the captured image from the in-vehicle camera 10R. As illustrated in FIG. 10B, the process detects feature points F from the extracted image.

Various points such as an intersection between white lines on a road surface can be detected as feature point F if the point can specify a position in the captured image.

The embodiment applies the bird's-eye view conversion to a captured image to display a bird's-eye image. In this case, the process may extract a range of image to be displayed as the bird's-eye image indicated by broken lines in FIGS. 10A and 10B instead of an entire image of overlapping region D (BR) and detect feature points F from the image.

The process calculates a reliability evaluation value for the detected feature point (S203). The reliability evaluation value for the feature point provides an index to evaluate how reliably the calibration can be performed by using the detected feature point.

Figure 11A:
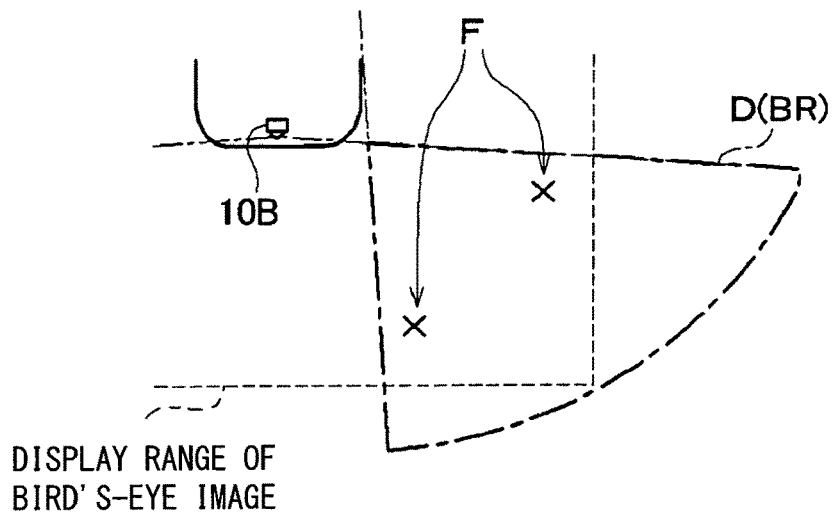
FIG. 11A is an explanatory diagram illustrating an example of detecting a feature point in the image of the overlap region.

For example, highly reliable calibration is considered difficult if there is a small number of detected feature points F as illustrated in FIG. 11A.

Figure 11B:
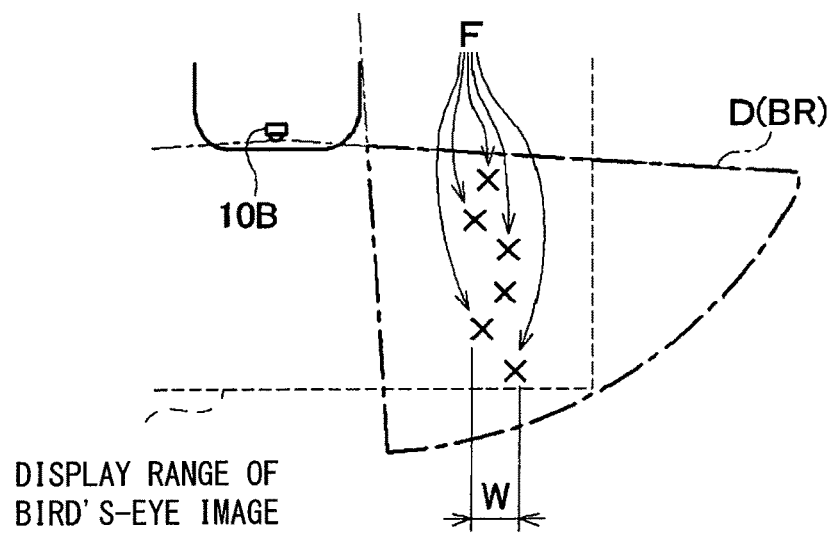
FIG. 11B is an explanatory diagram illustrating an example of detecting a feature point in the image of the overlap region.

Highly reliable calibration is also considered difficult if biased distribution results from many feature points F if detected. Biased distribution of feature points F can be evaluated by using distribution width W of feature points F as illustrated in FIG. 11B. Biased distribution can be also evaluated by using distribution of coordinate values for feature points F.

Furthermore, highly reliable calibration is considered difficult if many feature points F, if detected as distributed in a wide range, each provide low positional accuracy. For example, feature point F, if detected, cannot be detected with the sufficient positional accuracy if a captured image is blurred. Feature point F cannot be detected with the sufficient positional accuracy if the contrast is insufficient due to a too dark (or a too bright) captured image. Highly reliable calibration is considered difficult if feature point F cannot be detected with the sufficient positional accuracy.

The embodiment evaluates the positional accuracy of detected feature point F by using a brightness gradient of the image at the position where feature point is detected. This is because the image brightness is supposed to greatly change (to cause a large brightness gradient) at the position of feature point F if the image is not blurred at the position to detect feature point F and the sufficient contrast is acquired.

In consideration of the foregoing, the process calculates a reliability evaluation value for the feature point at S203 in FIG. 9 by using the following formula.

Reliability evaluation value=$\alpha$•(the number of feature points)+$\beta$•(distribution of feature points)+$\gamma$•(average value of brightness gradients corresponding to the feature points)

In this formula, $\alpha$, $\beta$, and $\gamma$ denote weight coefficients corresponding to the number of feature points, the distribution of feature points, and the average value of brightness gradients corresponding to the feature points. Predetermining an appropriate ratio among the weight coefficients can calculate a reliability evaluation value that appropriately reflects an effect of the number of feature points, the distribution of feature points, and the average value of brightness gradients corresponding to the feature points. According to the calculating formula, the reliability evaluation value increases as the number of feature points increases, the distribution of feature points widens, and the average value of brightness gradients corresponding to the feature points increases.

As above, the process calculates the reliability evaluation value for the feature points (S203 in FIG. 9). The process then determines whether the calculated reliability evaluation value is greater than or equal to a predetermined criterion value (S204).

The reliability evaluation value may result in being smaller than the criterion value (S204: no). Highly reliable calibration is then supposed to be unavailable even if the calibration uses the detected feature points. The process returns to the beginning, acquires captured images from the criterial camera and the targeted camera (S201), and then detects a feature point from an image of the overlap region in the captured images (S202). The process calculates a reliability evaluation value for the detected feature point (S203) and then determines whether the acquired reliability evaluation value exceeds a criterion value (S204).

The process is repeated to finally determine that the reliability evaluation value is larger than or equal to the criterion value (S204: yes). In this case, the process is supposed to have detected feature points capable of highly reliable calibration. The process starts calibrating the targeted camera as follows.

The process extracts an image of the region overlapping with the criterial camera (in-vehicle camera 10R) from a captured image from the targeted camera (in-vehicle camera 10B) and detects a feature point in the image (S205).

Figure 12:
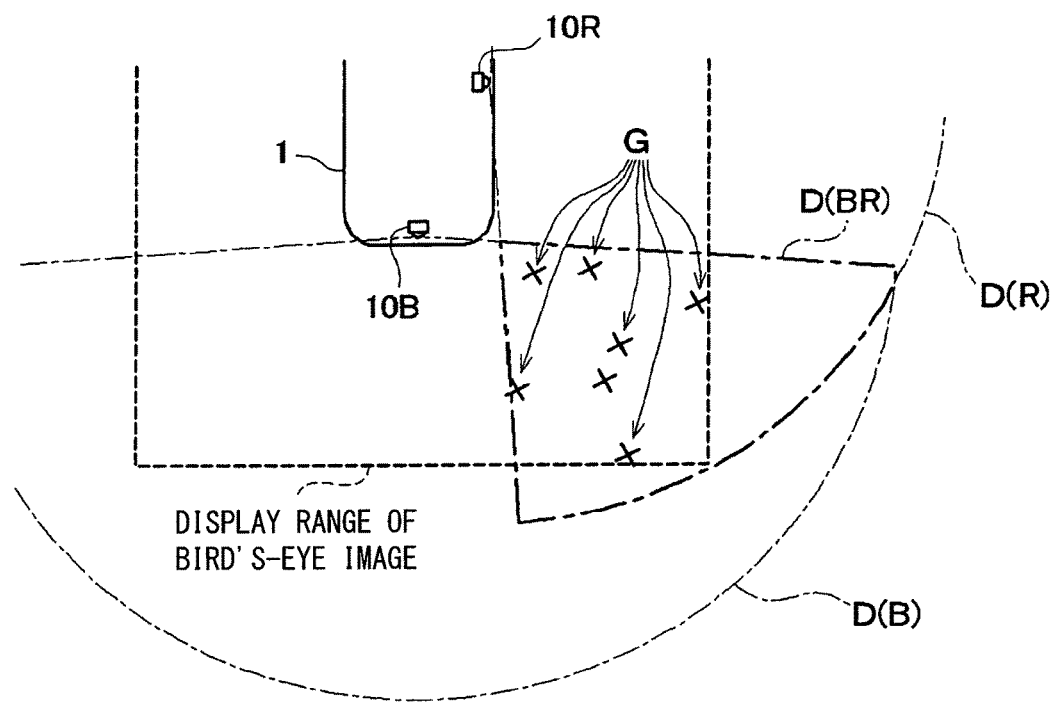
FIG. 12 is an explanatory diagram illustrating an example of extracting an image of the overlap region from captured images captured by the targeted camera and detecting a feature point.

FIG. 12 illustrates that the process extracts an image of region D (BR) from the captured image from the in-vehicle camera 10B and detects feature points G. Region D (BR) corresponds to an overlap between capture region D (B) for the in-vehicle camera 10B (targeted camera) and capture region D (R) for the in-vehicle camera 10R (criterial camera). Also in this case, the process may extract a range of image to be displayed as the bird's-eye image indicated by a broken line in FIG. 12 instead of an entire image of overlapping region D (BR) and detect feature points G from the image.

The process calibrates the installation position and the installation angle of the targeted camera based on the vehicle 1 so that feature point G (see FIG. 12) detected from the captured image from the targeted camera overlaps with feature point F (see FIG. 10B) detected from the captured image from the criterial camera. The calibration is based on the following principle.

For example, feature point F in FIG. 10B and feature point G in FIG. 12, when compared, differ from each other in positions with reference to the vehicle 1. This phenomenon is considered to occur because at least one of the installation position and the installation angle of the in-vehicle camera 10B as the targeted camera is misaligned with reference to the vehicle 1 and the bird's-eye view conversion cannot be correctly applied to a captured image.

The process performs the bird's-eye view conversion by variously changing the installation position and the installation angle of the targeted camera based on a currently estimated installation position and installation angle to acquire the position of feature point G. The process compares the position of feature point G with the position of feature point F acquired from the criterial camera. The process finally acquires a bird's-eye image that enables the position of feature point G to approximate to the position of feature point F so as to satisfy an error. The installation position and the installation angle assumed for the bird's-eye view conversion at the time may be considered correctly applicable to the misaligned targeted camera. The targeted camera can be calibrated by finding an installation position and an installation angle to enable the bird's-eye view conversion that allows feature point G detected from a captured image from the targeted camera to overlap with feature point F detected from a captured image from the criterial camera.

The process calibrates the targeted camera as above (S206) and updates the position of the contour stored as an initial state of the targeted camera (S207). The first calibration process in FIG. 9 then terminates. Namely, the contour position of the vehicle 1 is detected from the captured image from the targeted camera used for the calibration to update the position of the contour as the initial position of the targeted camera (in-vehicle camera 10B) before the first calibration process terminates.

The above-mentioned image generation process (see FIGS. 4 and 5) subsequently applies the bird's-eye view conversion (S111 in FIG. 5) to a captured image from the targeted camera (in-vehicle camera 10B) on the assumption that the installation position and the installation angle of the targeted camera are calibrated.

There has been described the process (first calibration process) to calibrate the targeted camera when the targeted camera to be calibrated is adjacent to the criterial camera used as a criterion for the calibration. In contrast, the targeted camera is calibrated as follows when the targeted camera is not adjacent to the criterial camera.

D. Second Calibration Process

Figure 13:
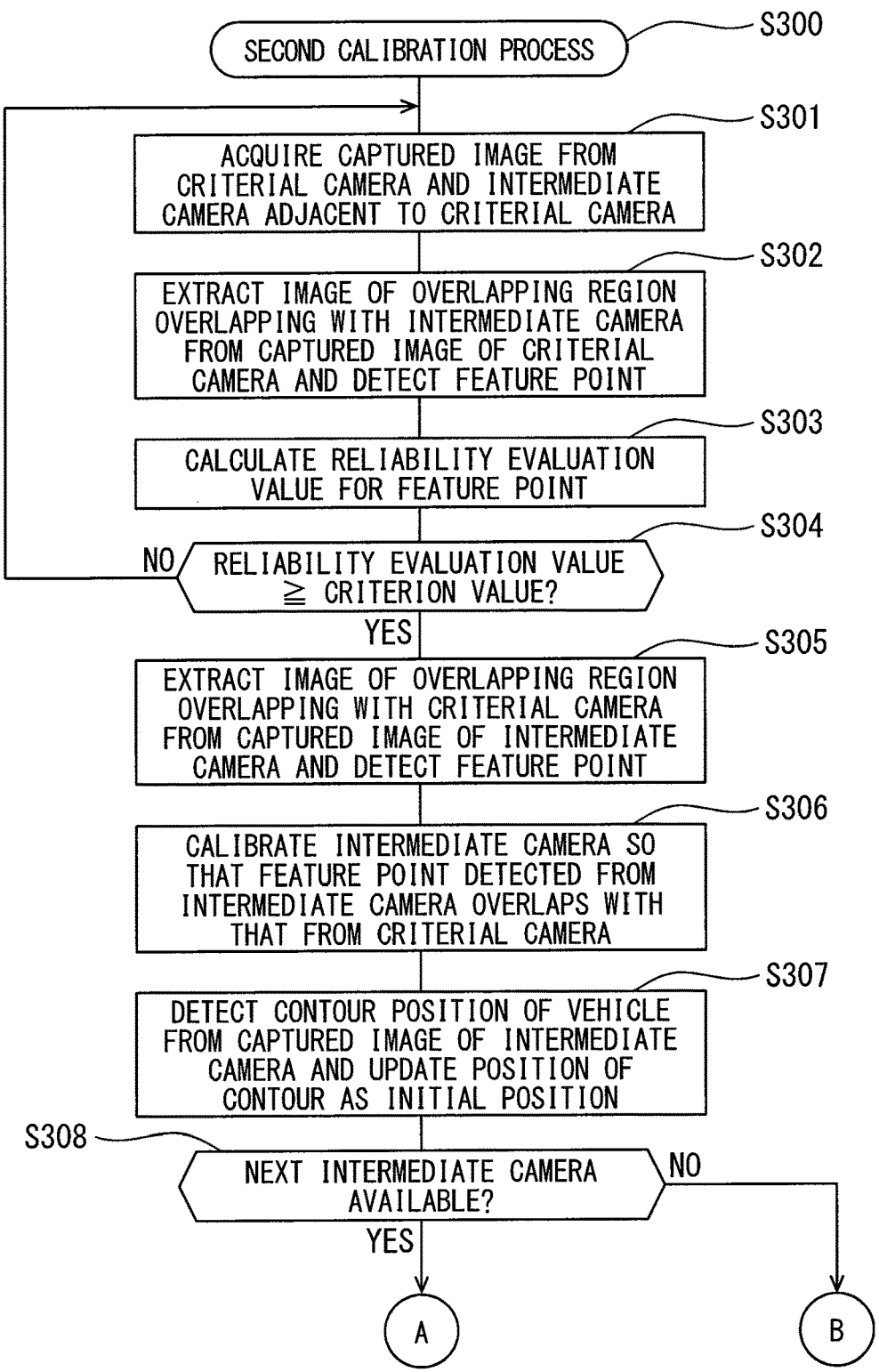
FIG. 13 is a flowchart illustrating a first part of a second calibration process to calibrate a targeted camera based on a criterial camera when the criterial camera and the targeted camera are not adjacent to each other.
Figure 14:
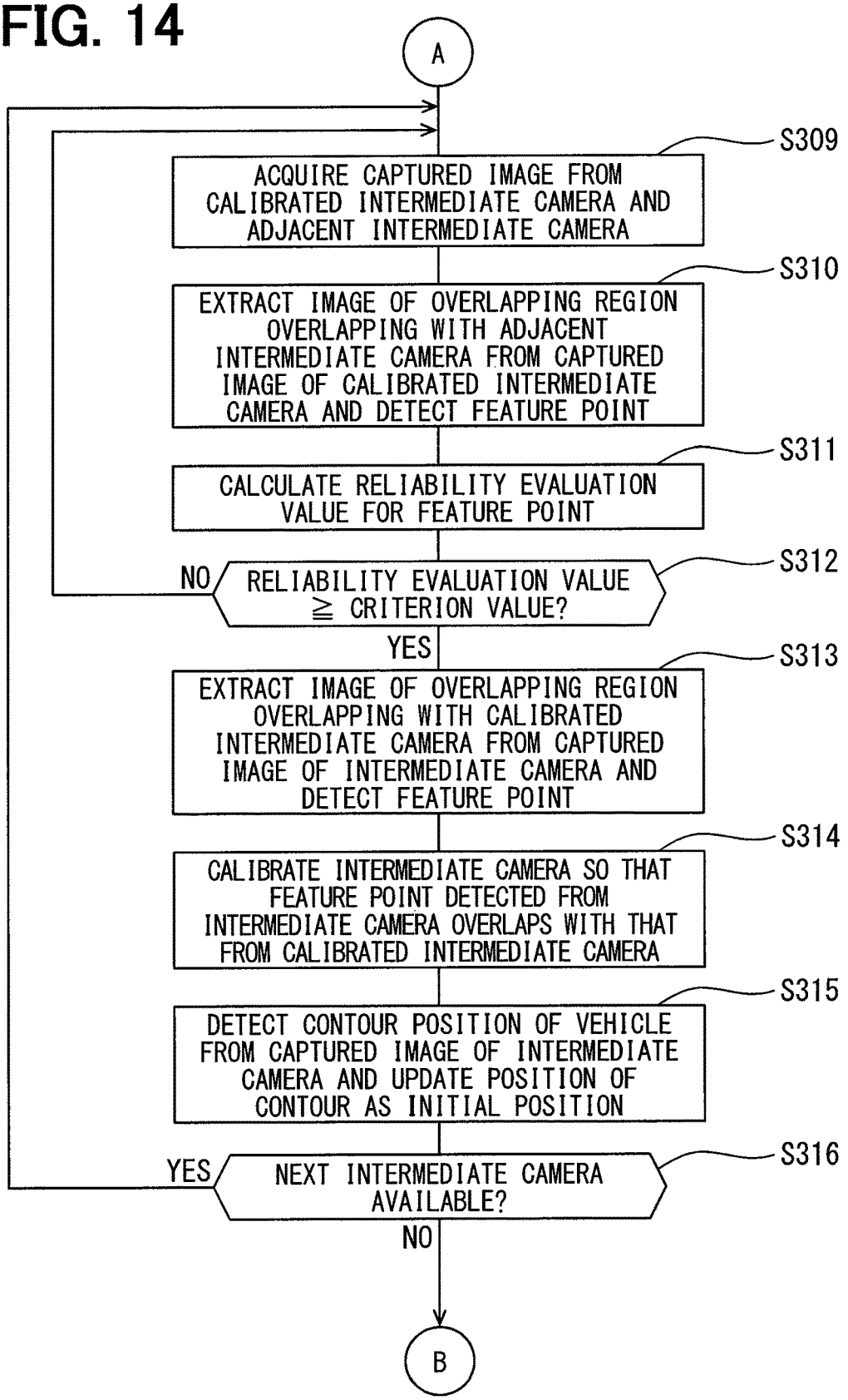
FIG. 14 is a flowchart illustrating an intermediate part of the second calibration process.
Figure 15:
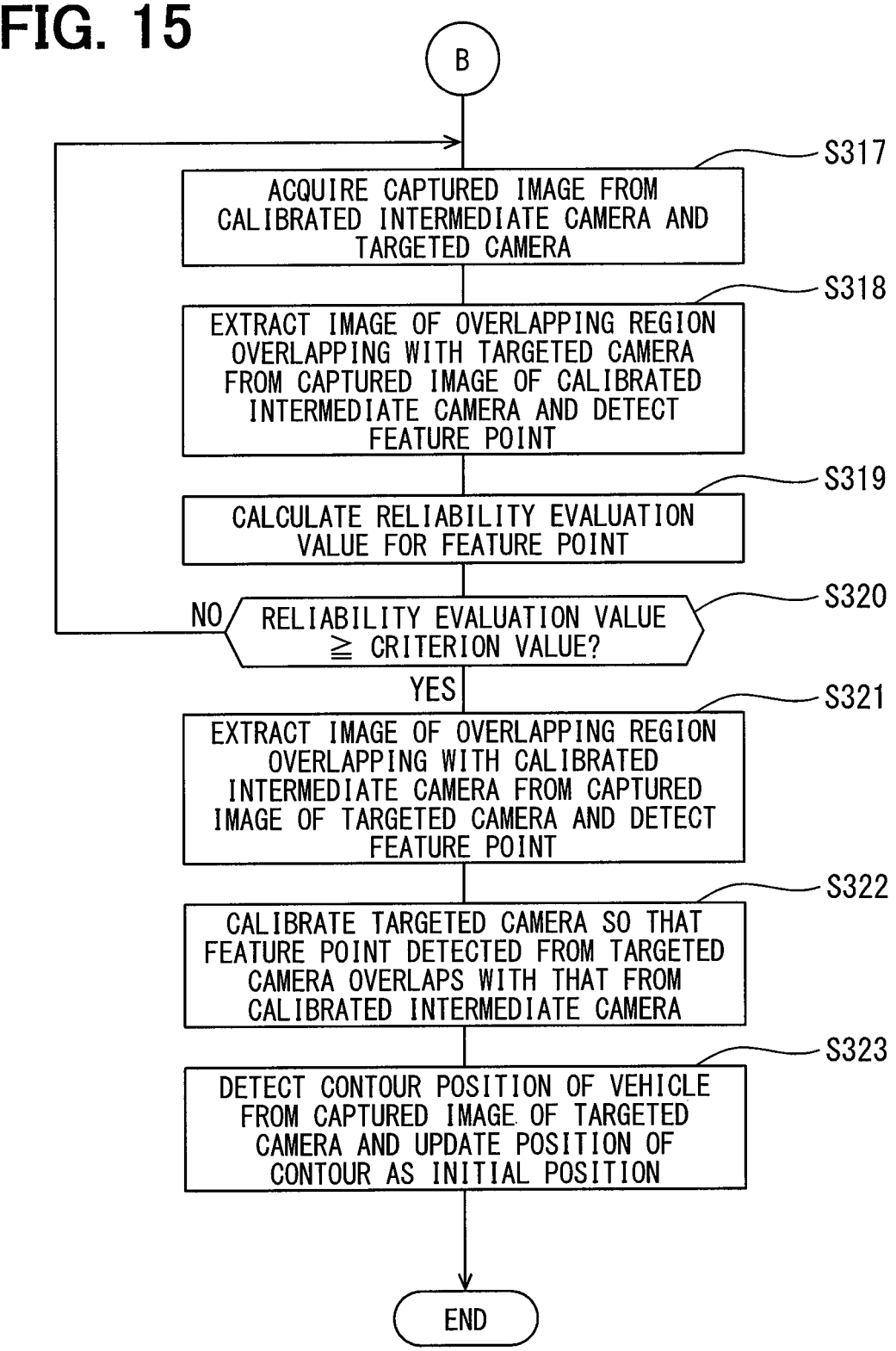
FIG. 15 is a flowchart illustrating the last part of the second calibration process.

FIGS. 13 through 15 illustrate a flowchart of a second calibration process. As above, the process starts when the targeted camera and the criterial camera assumed in the image generation process in FIGS. 4 and 5 correspond to in-vehicle cameras that are not adjacent to each other. The image generator 100 (and the in-vehicle camera calibrator 200) performs the process.

Prior to the detailed description of the second calibration process, the description below summarizes a difference between the first calibration process and the second calibration process for convenience sake. The above-mentioned first calibration process is used when the criterial camera is adjacent to the targeted camera and part of the capture region for the criterial camera overlaps with part of the capture region for the targeted camera. The first calibration process can therefore calibrate the targeted camera by using a captured image from the criterial camera.

The second calibration process cannot directly calibrate the targeted camera by using a captured image from the criterial camera because the criterial camera and the targeted camera are not adjacent. The process therefore first calibrates an intermediate camera adjacent to the criterial camera buy using a captured image from the criterial camera. The process calibrates the targeted camera by using a captured image from the calibrated intermediate camera when the intermediate camera is adjacent to the targeted camera.

The process calibrates the intermediate camera adjacent to the criterial camera by using a captured image from the criterial camera when the intermediate camera adjacent to the criterial camera is not adjacent to the targeted camera. The process calibrates an intermediate camera adjacent to the calibrated intermediate camera by using a captured image from the calibrated intermediate camera. The process successively calibrates intermediate cameras from the intermediate camera adjacent to the criterial camera and can finally calibrate an intermediate camera adjacent to the targeted camera. The process calibrates the intermediate camera adjacent to the targeted camera and then calibrates the targeted camera by using a captured image from the calibrated intermediate camera.

The description below concisely explains the second calibration process mainly in terms of a difference from the first calibration process.

As illustrated in FIG. 13, the second calibration process starts (S300). The process acquires a captured image captured by the criterial camera and a captured image captured by an intermediate camera adjacent to the criterial camera from the captured image acquirer section 101 (S301). Based on the example in FIG. 7B, the description below assumes that the criterial camera corresponds to the in-vehicle camera 10F and the targeted camera corresponds to the in-vehicle camera 10B.

The process extracts an image of a region overlapping with the capture region for the adjacent intermediate camera from a captured image captured by the criterial camera and detects a feature point in the image (S302). Suppose the criterial camera corresponds to the in-vehicle camera 10F and the adjacent intermediate camera corresponds to the in-vehicle camera 10R. In this case, the process extracts an image of region D (FR) from a captured image captured by the in-vehicle camera 10F (see FIG. 2) and detects feature point F.

The process calculates a reliability evaluation value for the detected feature point (S303). The reliability evaluation value for a feature point and the method of calculating the reliability evaluation value are the same as the contents of the above-mentioned first calibration process and a description is omitted here.

The process then determines whether the calculated reliability evaluation value is greater than or equal to a predetermined criterion value (S304).

The reliability evaluation value may result in being smaller than the criterion value (S304: no). The process then returns to the beginning, again acquires captured images from the criterial camera and the intermediate camera adjacent to the criterial camera (S301), and repeats the above-mentioned sequence of processing (S302 through S304).

The process is repeated to finally determine that the reliability evaluation value is larger than or equal to the criterion value (S304: yes). The process extracts an image of the region overlapping with the criterial camera (in-vehicle camera 10F) from a captured image from the intermediate camera (in-vehicle camera 10R) adjacent to the criterial camera and detects a feature point in the image (S305).

The process calibrates the intermediate camera by finding an installation position and an installation angle that allow a feature point detected from the captured image captured by the intermediate camera to overlap with a feature point detected from the captured image captured by the criterial camera (S306).

The installation position and the installation angle of the intermediate camera are merely misaligned so as to eliminate the need for the calibration. However, the criterial camera corresponds to one of the in-vehicle cameras mounted on the vehicle and indicates the minimum misalignment. An intermediate camera may be misaligned much more than the criterial camera. As above, calibrating an adjacent intermediate camera by using a captured image captured by the criterial camera can decrease the amount of misalignment of the intermediate camera to the level equal to the amount of misalignment of the criterial camera.

The process calibrates the intermediate camera adjacent to the criterial camera (S306) as above, updates the position of the contour stored as the initial state of the intermediate camera (S307), and then determines whether there is a next intermediate camera adjacent to the intermediate camera (S308). As illustrated in FIG. 7B, the criterial camera corresponds to the in-vehicle camera 10F, the intermediate camera corresponds to the in-vehicle camera 10R, and the targeted camera corresponds to the in-vehicle camera 10B. The process therefore determines that there is no next intermediate camera (S308: no).

In contrast, the process determines that there is a next intermediate camera (S308: yes) when there is a plurality of intermediate cameras between the criterial camera and the targeted camera as illustrated in FIG. 8A. In this case, the process newly acquires a captured image captured by the calibrated intermediate camera and a captured image captured by the next intermediate camera adjacent to that intermediate camera from the captured image acquirer section 101 (S309 in FIG. 14). The process then calibrates the next intermediate camera by using these captured images similarly to the above-mentioned sequence of processing (S302 through S307).

In reference to FIG. 14, the process extracts an image of the overlap region overlapping with the adjacent intermediate camera from a captured image captured by the calibrated intermediate camera and detects a feature point from the image (S310). The process calculates a reliability evaluation value for the detected feature point (S311) and determines whether the acquired reliability evaluation value is greater than or equal to a predetermined criterion value (S312).

The reliability evaluation value may be smaller than the criterion value (S312: no). The process then returns to the beginning of the process and acquires a new captured image (S309). The reliability evaluation value may be greater than or equal to the criterion value (S312: yes). The process then extracts an image of the overlap region overlapping with the calibrated intermediate camera from a captured image captured by an intermediate camera adjacent to the calibrated intermediate camera and detects a feature point in the image (S313).

The process calibrates the intermediate camera so that the feature point detected from the captured image captured by the intermediate camera overlaps with a feature point detected from the captured image captured by the calibrated intermediate camera (S314). The process updates the position of the contour stored as the initial state of the intermediate camera (S315).

The process then determines whether there is a next intermediate camera adjacent to the intermediate camera (S316). The next intermediate camera may exist (S316: yes). The process then returns to S309 and repeats a sequence of the subsequent processing (S309 through S316).

There may be no next intermediate camera (S316: no). In this case, the process is performed similarly to the above between the calibrated intermediate camera and the targeted camera adjacent to the intermediate camera to calibrate the targeted camera.

The process acquires a captured image captured by the calibrated intermediate camera and a captured image captured by the targeted camera adjacent to that intermediate camera from the captured image acquirer section 101 (S317 in FIG. 15). The process extracts an image of the overlap region overlapping with the targeted camera from a captured image captured by the calibrated intermediate camera and detects a feature point (S318). The process calculates a reliability evaluation value for the feature point (S319) and determines whether the reliability evaluation value is greater than or equal to a predetermined criterion value (S320).

The reliability evaluation value may be smaller than the criterion value (S320: no). The process then returns to the beginning and acquires a new captured image (S317). The reliability evaluation value may be greater than or equal to the criterion value (S320: yes). The process then extracts an image of the overlap region overlapping with the calibrated intermediate camera from a captured image captured by the targeted camera and detects a feature point (S321). The process calibrates the targeted camera so that the feature point detected from the captured image captured by the targeted camera overlaps with a feature point detected from the captured image captured by the calibrated intermediate camera (S322). The process updates the position of the contour stored as an initial state of the targeted camera (S323). The second calibration process in FIGS. 13 through 15 then terminates.

The above-mentioned image generation process (see FIGS. 4 and 5) may later apply the bird's-eye view conversion to captured images captured by the targeted camera and the intermediate camera (S111 in FIG. 5) based on the calibrated installation position and installation angle.

Figure 16:
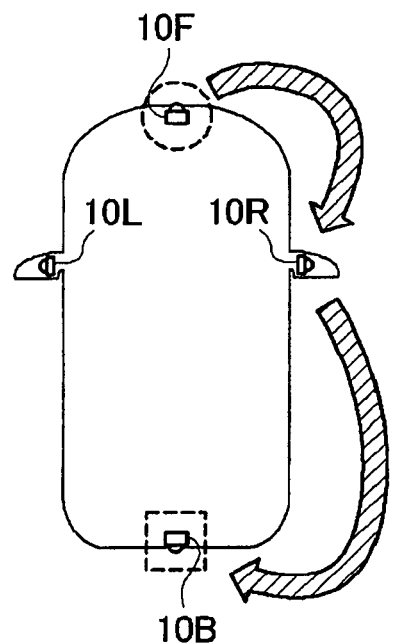
FIG. 16 is an explanatory diagram schematically illustrating an example of calibrating a targeted camera based on a criterial camera when the criterial camera and the targeted camera are not adjacent to each other.

FIG. 16 conceptually illustrates how the above-mentioned second calibration process calibrates the targeted camera. According to the illustrated example, the criterial camera (in-vehicle camera 10F) calibrates the intermediate camera (in-vehicle camera 10R). The calibrated intermediate camera (in-vehicle camera 10R) calibrates the targeted camera (in-vehicle camera 10B).

The targeted camera (in-vehicle camera 10B) can be calibrated based on the least misaligned criterial camera (in-vehicle camera 10F) and therefore can be calibrated more accurately than based on the adjacent intermediate camera (in-vehicle camera 10R).

The intermediate camera (in-vehicle camera 10R) is also calibrated by using the criterial camera (in-vehicle camera 10F) prior to calibration of the targeted camera (in-vehicle camera 10B). Three of the four in-vehicle cameras can therefore keep the amount of misalignment of the installation position and the installation angle equal to the level of the criterial camera.

Obviously, the remaining in-vehicle camera 10L cannot be adjusted to the level equal to the criterial camera. However, if this in-vehicle camera is much misaligned and requires the calibration, at least one of the three in-vehicle cameras 10F, 10R, and 10B just needs to maintain the state immediately after the calibration. That in-vehicle camera can be used as the criterial camera for calibration. The accurate calibration is therefore available even if the calibration is repeated.

Figure 17A:
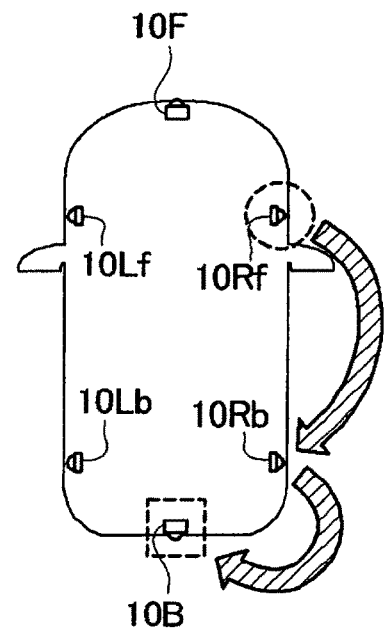
FIG. 17A is an explanatory diagram schematically illustrating another mode of calibrating a targeted camera based on a criterial camera when the criterial camera and the targeted camera are not adjacent to each other.
Figure 17B:
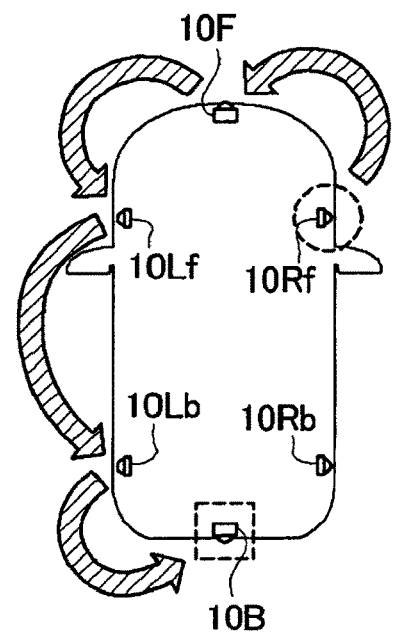
FIG. 17B is an explanatory diagram schematically illustrating another mode of calibrating a targeted camera based on a criterial camera when the criterial camera and the targeted camera are not adjacent to each other.

As above with reference to FIG. 8B, an intermediate camera can be selected so as to decrease the number of intermediate cameras or increase the number of intermediate cameras. FIGS. 17A and 17B conceptually illustrate calibration of the targeted camera in these cases.

FIG. 17A illustrates selection of an intermediate camera to decrease the number of intermediate cameras. The number of intermediate cameras to be calibrated decreases and therefore enables fast calibration of the targeted camera.

FIG. 17B illustrates selection of an intermediate camera to increase the number of intermediate cameras. Many intermediate cameras can keep the amount of in-vehicle camera misalignment equal to the level of the criterial camera. There is an ever increasing possibility of selecting a permissibly misaligned in-vehicle camera as the criterial camera when the calibration is required next. As a result, the accuracy is not degraded even if the calibration is repeated.

E. Modification

There has been described the embodiment on the assumption that the criterial camera is used to calibrate the targeted camera when the criterial camera and the targeted camera are adjacent to each other. In this case, at least one in-vehicle camera remains uncalibrated. There has been also described the embodiment on the assumption that the criterial camera is used to calibrate an intermediate camera and the calibrated intermediate camera is used to calibrate the targeted camera when the criterial camera and the targeted camera are not adjacent to each other. Also in this case, at least one in-vehicle camera remains uncalibrated.

The criterial camera may be used to calibrate all the remaining in-vehicle cameras.

Figure 18:
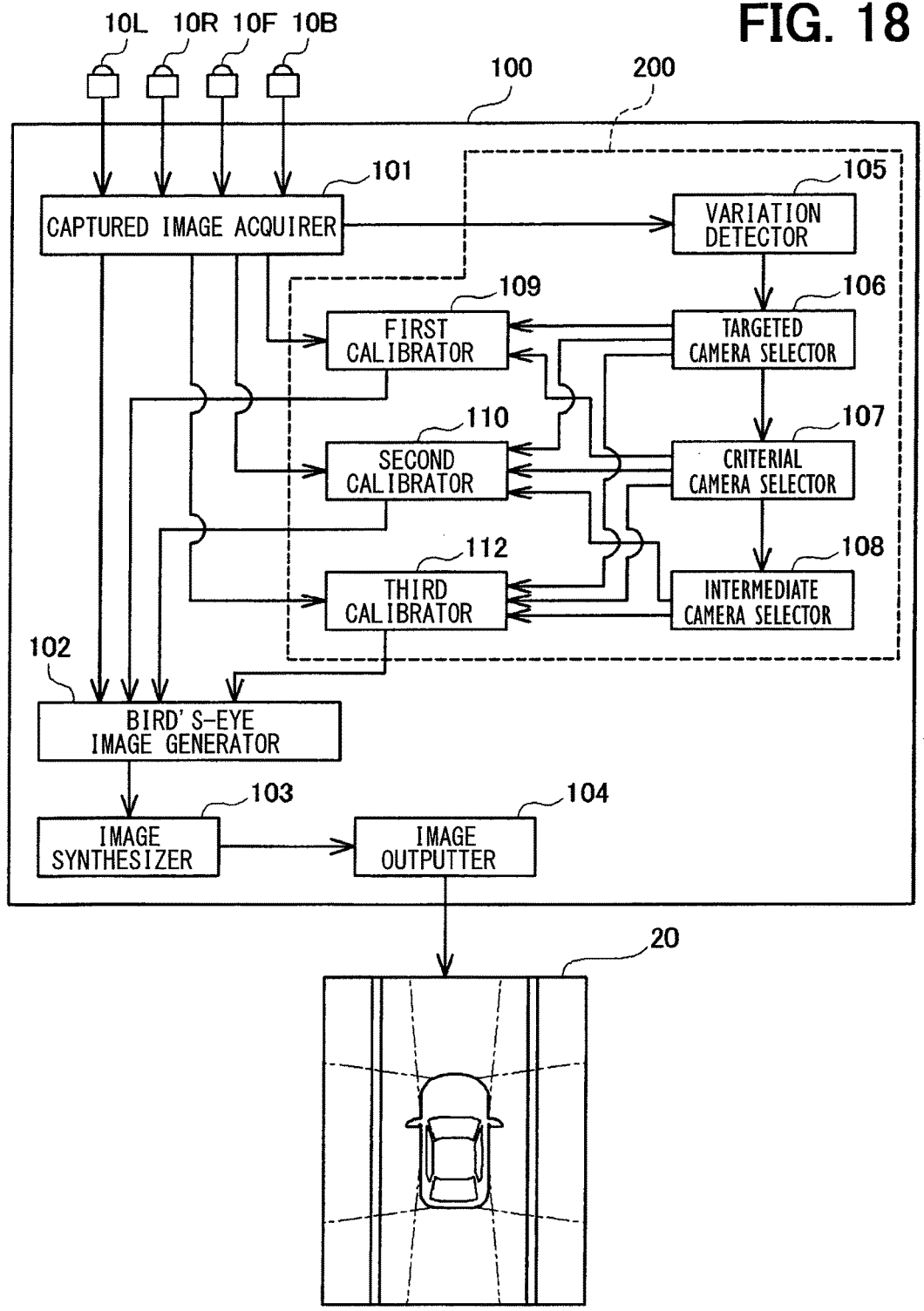
FIG. 18 is an explanatory diagram schematically illustrating an internal configuration of an image generator according to a modification.

FIG. 18 schematically illustrates an internal configuration of the image generator 100 according to the modification and the in-vehicle camera calibrator 200 according to the modification. The image generator 100 (and the in-vehicle camera calibrator 200) in FIG. 18 according to the modification differs from the image generator 100 (and the in-vehicle camera calibrator 200) in FIG. 3 according to the above-mentioned embodiment in that the alarm outputter section 111 is replaced by a third calibrator section 112. The image generator 100 according to the modification may include the alarm outputter section 111.

The third calibrator section 112 acquires information about an in-vehicle camera selected as the targeted camera from the targeted camera selector section 106, information about an in-vehicle camera selected as the criterial camera from the criterial camera selector section 107, and information about an in-vehicle camera selected as the intermediate camera from the intermediate camera selector section 108. The third calibrator section 112 uses the criterial camera or the targeted camera as a criterion to update one of the in-vehicle cameras 10F, 10B, 10L, and 10R that is not selected as the criterial camera, the targeted camera, or the intermediate camera.

Figure 19:
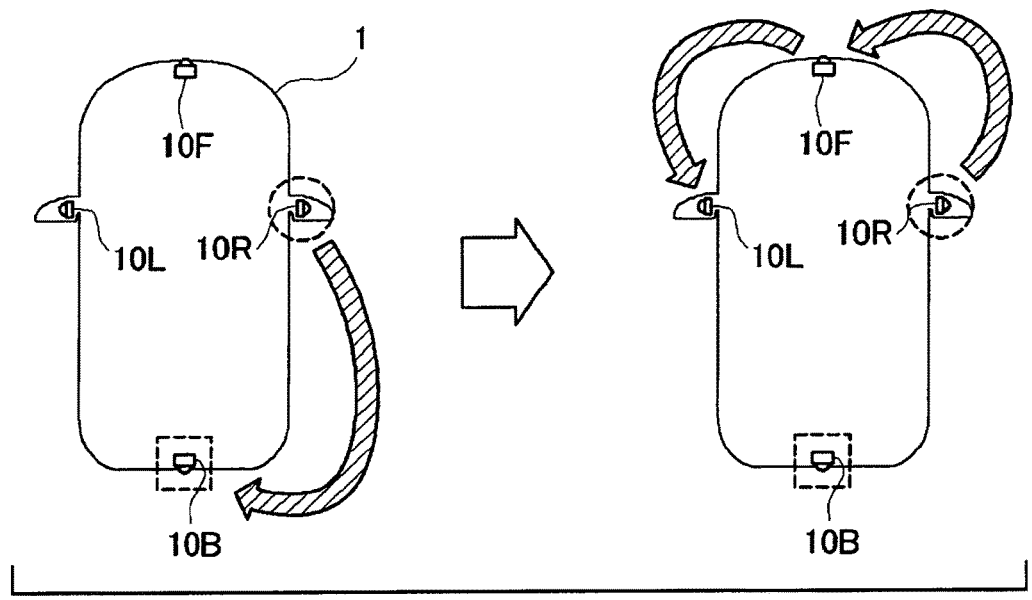
FIG. 19 is an explanatory diagram conceptually illustrating an example where an image generator and an in-vehicle camera calibrator according to the modification calibrate an in-vehicle camera.

As illustrated in FIG. 19, for example, suppose the targeted camera corresponds to the in-vehicle camera 10B (enclosed in a broken-line rectangle in the drawing) and the criterial camera corresponds to the in-vehicle camera 10R (enclosed in a broken-line circle in the drawing). In this case, the first calibrator section 109 calibrates the targeted camera (in-vehicle camera 10B) by using the criterial camera (in-vehicle camera 10R) as illustrated at the left part of FIG. 19.

The third calibrator section 112 then calibrates the in-vehicle camera 10F by using the criterial camera (in-vehicle camera 10R) and calibrates the in-vehicle camera 10L by using the updated in-vehicle camera 10F as illustrated at the right of the FIG. 19.

Figure 20:
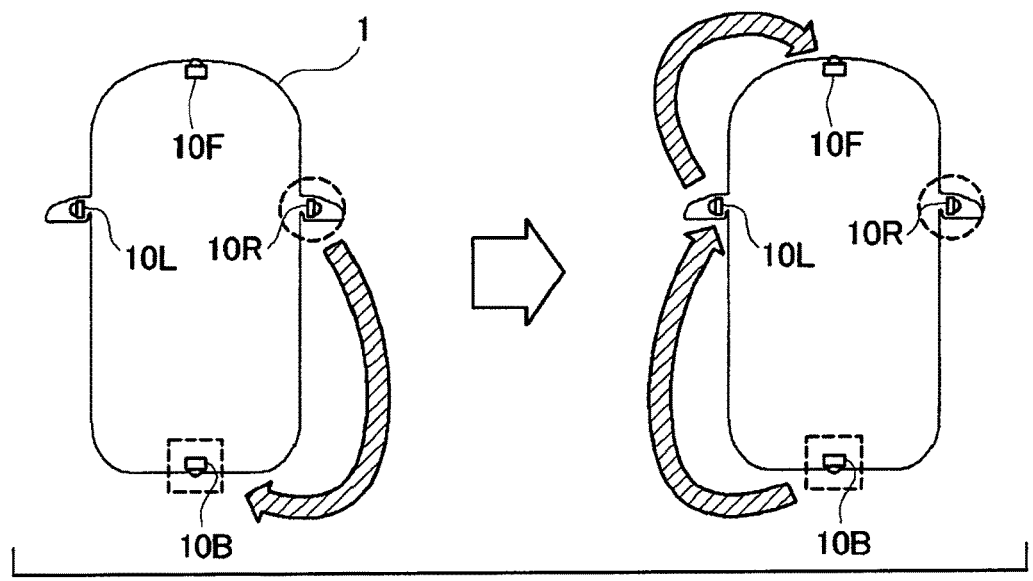
FIG. 20 is an explanatory diagram conceptually illustrating another mode where the image generator and the in-vehicle camera calibrator 200 according to the modification calibrate an in-vehicle camera.

The third calibrator section 112 may perform the calibration as illustrated in FIG. 20. The first calibrator section 109 calibrates the targeted camera (in-vehicle camera 10B) by using the criterial camera (in-vehicle camera 10R) (see the left part of FIG. 20). The third calibrator section 112 may calibrate the in-vehicle camera 10L by using the calibrated targeted camera and may calibrate the in-vehicle camera 10F by using the calibrated in-vehicle camera 10L (see the right part of FIG. 20).

As above with reference to FIGS. 17A and 17B, an intermediate camera can be selected so as to decrease the number of intermediate cameras or increase the number of intermediate cameras. In this case, the modification calibrates an in-vehicle camera as follows.

Figure 21:
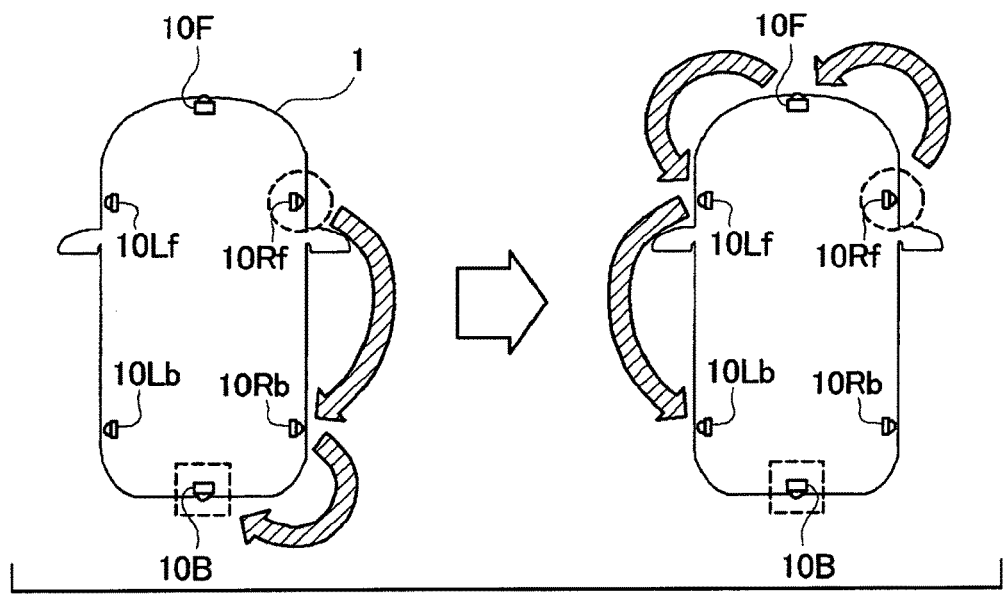
FIG. 21 is an explanatory diagram conceptually illustrating an example where the image generator according to the modification calibrates an in-vehicle camera when there is a plurality of ways of selecting an intermediate camera.

For example, suppose the vehicle 1 is mounted with six in-vehicle cameras 10F, 10B, 10Rf, 10Rb, 10Lf, and 10Lb as illustrated in FIG. 21, the in-vehicle camera 10B corresponds to the targeted camera, and the in-vehicle camera 10Rf corresponds to the criterial camera. In this case, the modification selects the in-vehicle camera 10Rb as the intermediate camera so as to decrease the number of intermediate cameras.

As illustrated at the left of FIG. 21, the second calibrator section 110 uses the criterial camera (in-vehicle camera 10Rf) to calibrate the intermediate camera (in-vehicle camera 10Rb) and then uses the calibrated intermediate camera to calibrate the targeted camera (in-vehicle camera 10B).

The third calibrator section 112 then uses the criterial camera (in-vehicle camera 10Rf) to calibrate the remaining in-vehicle camera 10F, the in-vehicle camera 10Lf, and finally the in-vehicle camera 10Lb as illustrated at the right of FIG. 21.

Figure 22:
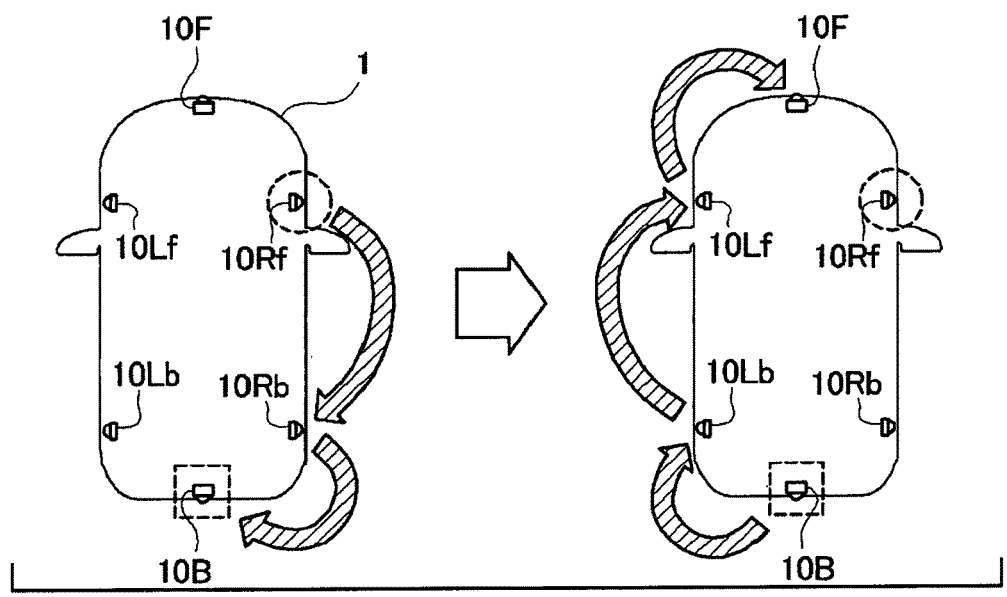
FIG. 22 is an explanatory diagram conceptually illustrating another mode where the image generator according to the modification calibrates an in-vehicle camera when there is a plurality of ways of selecting an intermediate camera.

Alternatively, the second calibrator section 110 may use the criterial camera (in-vehicle camera 10Rf) to calibrate the intermediate camera (in-vehicle camera 10Rb) and then the targeted camera (in-vehicle camera 10B) as illustrated at the left of FIG. 22. The third calibrator section 112 may then use the calibrated targeted camera (in-vehicle camera 10B) to calibrate the in-vehicle camera 10Lb, the in-vehicle camera 10Lf, and finally the in-vehicle camera 10F as illustrated at the right of FIG. 22.

The above-mentioned modification can fast calibrate the targeted camera by using the criterial camera when the criterial camera and the targeted camera are adjacent to each other. An intermediate camera is selected when the criterial camera and the targeted camera are not adjacent to each other. An intermediate camera is selected so as to decrease the number of intermediate cameras when there are options to select an intermediate camera so as to decrease the number of intermediate cameras and increase the number of intermediate cameras. The criterial camera is used to calibrate the intermediate camera. The calibrated intermediate camera is then used to calibrate the targeted camera. The targeted camera can be fast calibrated even when an intermediate camera is used for the calibration.

After the targeted camera is calibrated, the remaining uncalibrated in-vehicle cameras can be calibrated to the level equal to the criterial camera. When the calibration is required next time, at least one of the in-vehicle cameras is considered to keep the state immediately after the calibration without misalignment. Even repeated calibration can prevent the calibration accuracy from degrading.

While the present disclosure has been described with reference to embodiments thereof, it is to be understood that the disclosure is not limited to the embodiments and constructions. The present disclosure is intended to cover various modification and equivalent arrangements. In addition, the various combinations and configurations, other combinations and configurations, including more, less or only a single element, are also within the spirit and scope of the present disclosure.

The invention claimed is:

1. An in-vehicle camera calibrator that
is used for a vehicle mounted with a plurality of in-vehicle cameras attached so that capture regions of the in-vehicle cameras adjacent to each other partially overlap and
calibrates at least one of an installation position and an installation angle of any of the in-vehicle cameras that has misalignment of the at least one of the installation position and the installation angle with reference to the vehicle,
the in-vehicle camera calibrator comprising:
a variation detector section that detects a variation from an initial state of at least one of an installation angle and an installation position of each of the in-vehicle cameras with reference to the vehicle;
a targeted camera selector section that selects the in-vehicle camera indicating the variation greater than a predetermined threshold value as a targeted camera that requires the calibration;
a criterial camera selector section that selects the in-vehicle camera indicating the smallest variation out of the in-vehicle cameras as a criterial camera when the targeted camera is selected from the in-vehicle cameras;
an intermediate camera selector section that selects an intermediate camera when the intermediate camera exists, wherein the intermediate camera is the in-vehicle camera that is interposed between the targeted camera and the criterial camera;
a first calibrator section that, when the intermediate camera is not selected, calibrates the targeted camera based on a captured image of an overlapping region where the capture regions of the criterial camera and the targeted camera overlap; and
a second calibrator section that, when the intermediate camera is selected, calibrates the intermediate camera based on a captured image of an overlapping region where the capture regions of the criterial camera and the targeted camera overlap, and then calibrates the targeted camera based on a captured image of an overlapping region where the capture regions of the calibrated intermediate camera and the targeted camera overlap.

2. The in-vehicle camera calibrator according to claim 1 further comprising:
a third calibrator section that calibrates the uncalibrated in-vehicle camera after the targeted camera is calibrated.

3. The in-vehicle camera calibrator according to claim 1 further comprising:
an alarm outputter section that outputs a predetermined alarm when the variation of the in-vehicle camera selected as the criterial camera is greater than a predetermined tolerance.

4. An image generator that
is used for a vehicle mounted with a plurality of in-vehicle cameras attached so that capture regions of the in-vehicle cameras adjacent to each other partially overlap and
generates a monitoring image for monitoring a situation around the vehicle based on captured images acquired by the in-vehicle cameras, the image generator comprising:
a captured image acquirer section that acquires the captured images from the in-vehicle cameras;
a variation detector section that detects a variation from an initial state of at least one of an installation angle and an installation position of each of the in-vehicle cameras with reference to the vehicle;
a targeted camera selector section that selects the in-vehicle camera indicating the variation greater than a predetermined threshold value as a targeted camera that requires calibrating the installation angle or the installation position;
a criterial camera selector section that selects the in-vehicle camera indicating the smallest variation out of the in-vehicle cameras as a criterial camera when the targeted camera is selected from the in-vehicle cameras;
an intermediate camera selector section that selects an intermediate camera when the intermediate camera exists, wherein the intermediate camera is the in-vehicle camera that is interposed between the targeted camera and the criterial camera;
a first calibrator section that, when the intermediate camera is not selected, calibrates the targeted camera based on the captured image of an overlapping region where the capture regions of the criterial camera and the targeted camera overlap;
a second calibrator section that, when the intermediate camera is selected, calibrates the intermediate camera based on the captured image of an overlapping region where the capture regions of the criterial camera and the intermediate camera overlap, and then calibrates the targeted camera based on the captured image of an overlapping region where the capture regions of the calibrated intermediate camera and the targeted camera overlap; and an image generator section that generates the monitoring image by applying visual line conversion to the captured images acquired from the in-vehicle cameras based on a result of calibrating the in-vehicle camera.

5. An in-vehicle camera calibration method that
is used for a vehicle mounted with a plurality of in-vehicle cameras attached so that capture regions of the in-vehicle cameras adjacent to each other partially overlap and
calibrates one of an installation position and an installation angle of any of the in-vehicle cameras that has misalignment of one of an installation position and an installation angle with reference to the vehicle,
the method comprising:
detecting a variation from an initial state of one of an installation angle and an installation position of each of the in-vehicle cameras with reference to the vehicle;
selecting the in-vehicle camera indicating the variation greater than a predetermined threshold value as a targeted camera that requires the calibration;
selecting the in-vehicle camera indicating the smallest variation out of the in-vehicle cameras as a criterial camera when the targeted camera is selected from the in-vehicle cameras;
in response to an intermediate camera being present, selecting the intermediate camera, wherein the intermediate camera is the in-vehicle camera that is interposed between the targeted camera and the criterial camera;
in response to the intermediate camera not being selected, calibrating the targeted camera based on a captured image of an overlapping region where the capture regions of the criterial camera and the targeted camera overlap; and
in response to the intermediate camera being selected, calibrating the intermediate camera based on a captured image of an overlapping region where the capture regions of the criterial camera and the intermediate camera overlap, and then calibrating the targeted camera based on a captured image of an overlapping region where the capture regions of the calibrated intermediate camera and the targeted camera overlap.

6. An image generation method that
is used for a vehicle mounted with a plurality of in-vehicle cameras attached so that capture regions the in-vehicle cameras adjacent to each other partially overlap and
generates a monitoring image for monitoring a situation around the vehicle based on captured images acquired by the in-vehicle cameras,
the method comprising:
acquiring the captured images from the in-vehicle cameras;
detecting a variation from an initial state of at least one of an installation angle and an installation position of each of the in-vehicle cameras with reference to the vehicle;
selecting the in-vehicle camera indicating the variation greater than a predetermined threshold value as a targeted camera that requires calibrating the installation angle or the installation position;
selecting the in-vehicle camera indicating the smallest variation out of the in-vehicle cameras as a criterial camera when the targeted camera is selected from the in-vehicle cameras;
in response to an intermediate camera being present, selecting the intermediate camera, wherein the intermediate camera is the in-vehicle camera that is interposed between the targeted camera and the criterial camera;
in response to the intermediate camera not being selected, calibrating the targeted camera based on the captured image of an overlapping region where the capture regions of the criterial camera and the targeted camera overlap;
in response to the intermediate camera being selected, calibrating the intermediate camera based on the captured image of an overlapping region where the capture regions of the criterial camera and the intermediate camera overlap, and then calibrating the targeted camera based on the captured image of an overlapping region where the capture regions of the calibrated intermediate camera and the targeted camera overlap; and
generating the monitoring image by applying visual line conversion to the captured image acquired from the in-vehicle cameras based on the result of calibrating the in-vehicle camera.

* * * * *